(12) United States Patent
Yoon et al.

(10) Patent No.: US 11,106,358 B2
(45) Date of Patent: Aug. 31, 2021

(54) ELECTRONIC DEVICE AND METHOD FOR CONTROLLING SCREEN DISPLAYED IN FLEXIBLE DISPLAY WHICH IS ROLLABLE

(71) Applicant: Samsung Electronics Co., Ltd., Gyeonggi-do (KR)

(72) Inventors: Yeojun Yoon, Gyeonggi-do (KR); Jiyeon Kwak, Gyeonggi-do (KR); Jaeyeon Rho, Gyeonggi-do (KR); Donghun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/744,629

(22) Filed: Jan. 16, 2020

(65) Prior Publication Data

US 2020/0225848 A1   Jul. 16, 2020

(30) Foreign Application Priority Data

Jan. 16, 2019   (KR) ........................ 10-2019-0005539

(51) Int. Cl.
*G06F 3/041* (2006.01)
*G06F 3/0488* (2013.01)
*G06K 9/00* (2006.01)
*G09F 9/30* (2006.01)
*G06F 1/16* (2006.01)

(52) U.S. Cl.
CPC ........ *G06F 3/04886* (2013.01); *G06F 1/1652* (2013.01); *G06K 9/00087* (2013.01); *G09F 9/301* (2013.01)

(58) Field of Classification Search
CPC . G06F 3/048; G06F 1/16; G06F 3/041; G06F 3/045; G06F 3/042; G06K 9/00; G09F 9/30

See application file for complete search history.

(56) References Cited

U.S. PATENT DOCUMENTS

| 9,230,468 | B2 | 1/2016 | Kwack et al. |
| 10,007,475 | B2 | 6/2018 | Jeon et al. |
| 10,452,156 | B2 | 10/2019 | Kang et al. |
| 2010/0141605 | A1 | 6/2010 | Kang et al. |

(Continued)

FOREIGN PATENT DOCUMENTS

| KR | 1020170038308 | 4/2017 |
| KR | 1020170062121 | 6/2017 |

(Continued)

OTHER PUBLICATIONS

International Search Report dated May 1, 2020 issued in counterpart application No. PCT/KR2020/000804, 9 pages.

*Primary Examiner* — Pegeman Karimi
(74) *Attorney, Agent, or Firm* — The Farrell Law Firm, P.C.

(57) ABSTRACT

Methods and electronic devices are provided. A first user interface (UI) having a size of a first portion of the flexible display, is displayed within the first portion. A user input associated with a first point and a second point, both in the first portion, is identified while displaying the first UI within the first portion. The first point is different from the second point. A second UI, based at least in part on the first UI, is displayed within a second portion of the flexible display, in response to identifying the user input. The second portion is distinct from the first portion.

20 Claims, 28 Drawing Sheets

(56) References Cited

U.S. PATENT DOCUMENTS

| | | | |
|---|---|---|---|
| 2012/0081317 A1* | 4/2012 | Sirpal | G06F 1/1647 |
| | | | 345/173 |
| 2013/0252668 A1 | 9/2013 | Cheng et al. | |
| 2013/0321340 A1* | 12/2013 | Seo | H04M 1/0241 |
| | | | 345/174 |
| 2015/0015525 A1 | 1/2015 | Cho et al. | |
| 2015/0325804 A1* | 11/2015 | Lindblad | G06F 3/0362 |
| | | | 313/511 |
| 2016/0026219 A1* | 1/2016 | Kim | G06F 1/1652 |
| | | | 345/173 |
| 2016/0266759 A1 | 9/2016 | Reeves | |
| 2018/0275770 A1* | 9/2018 | Kang | G06F 3/0485 |
| 2018/0284964 A1* | 10/2018 | Kang | G06F 1/3265 |

FOREIGN PATENT DOCUMENTS

| | | |
|---|---|---|
| KR | 1020170082926 | 7/2017 |
| KR | 101837714 | 3/2018 |

\* cited by examiner

ELECTRONIC DEVICE AND METHOD FOR CONTROLLING SCREEN DISPLAYED IN FLEXIBLE DISPLAY WHICH IS ROLLABLE

CROSS REFERENCE TO RELATED APPLICATION(S)

This application is based on and claims priority under 35 U.S.C. § 119(a) to Korean Patent Application No. 10-2019-0005539, filed on Jan. 16, 2019, in the Korean Intellectual Property Office, the disclosure of which is herein incorporated by reference in its entirety.

BACKGROUND

1. Field

The disclosure relates generally to screen control in an electronic device, and more particularly, to an electronic device for controlling a screen displayed on a flexible display which can be rolled, and a method thereof.

2. Description of Related Art

Various types of display devices are under development due to advancements made in electronic technologies. The display devices, such as, for example, televisions (TV), personal computers (PC), laptops, tablet PCs, mobile phones, MPEG-1 Audio Layer 3 (MP3) players, and the like, are widely distributed to be used in most homes. Recently, an effort has been made to develop newer types of display devices in order to cope with the needs of users who want newer and more varied functions. Such a display device is called a next-generation display. A flexible display is one example of a next-generation display device. The flexible display has a property of changing its shape, as if it is paper.

The flexible display can be used for various purposes since a shape thereof is changeable when a user bends it by force. For example, the flexible display may be implemented as a portable device, such as, for example, a mobile phone, a tablet PC, a laptop, an electronic picture frame, a personal digital assistant (PDA), an MP3 player, etc.

The flexible display may be rolled around both ends. The electronic device including the flexible display may display a user interface (UI) based on a size of an unrolled portion of the flexible display, when the flexible display is partially rolled. If the user further rolls or unrolls the flexible display in a state where the electronic device is operating, the electronic device may change the display of the UI in response to a change in the size of the unrolled portion of the flexible display. The user may perform a gesture associated with the change in the size of the unrolled portion of the flexible display, and the electronic device may change the display of the UI in response to the gesture.

SUMMARY

The present disclosure has been made to address at least the above problems and/or disadvantages and to provide at least the advantages described below.

According to an embodiment, an electronic device is provided that includes a flexible display, at least one sensor, a memory, and a processor operatively coupled with the flexible display, the at least one sensor, and the memory. The memory includes a plurality of instructions, and the plurality of instructions allow the processor to display a first UI having a size of a first portion of the flexible display, within the first portion. The instructions further allow the processor to identify a user input associated with a first point and a second point, both in the first portion, while displaying the first UI within the first portion. The first point is different from the second point. The instructions also allow the processor to display a second UI, based at least in part on the first UI, within a second portion of the flexible display, in response to identifying the user input. The second portion is distinct from the first portion.

According to another embodiment, a method of an electronic device is provided. A first UI having a size of a first portion of the flexible display, is displayed within the first portion. A user input associated with a first point and a second point, both in the first portion, is identified while displaying the first UI within the first portion. The first point is different from the second point. A second UI, based at least in part on the first UI, is displayed within a second portion of the flexible display, in response to identifying the user input. The second portion is distinct from the first portion.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
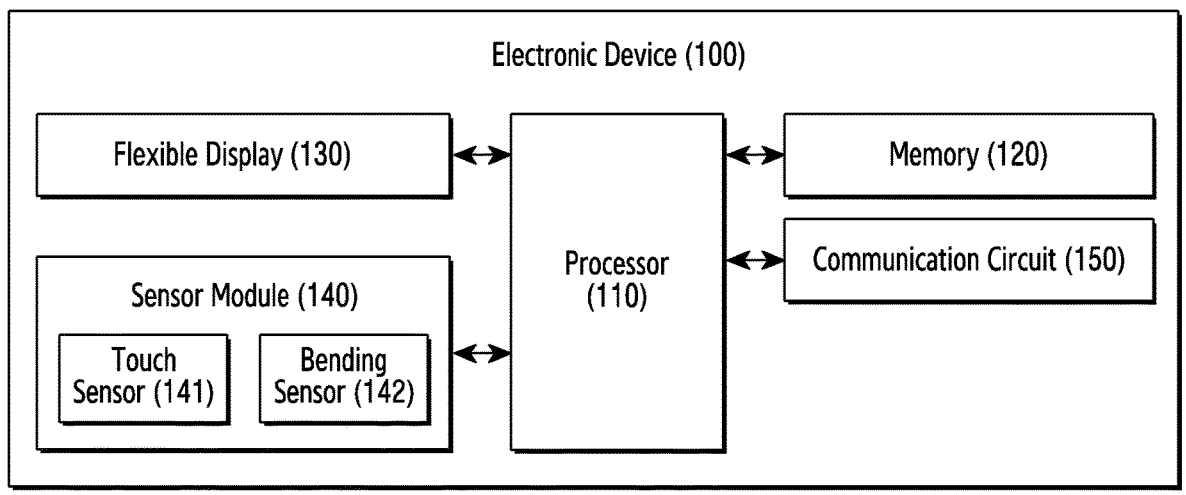
FIG. 1 is a diagram illustrating a functional structure of an electronic device, according to an embodiment.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The expressions "have", "may have", "include", "may include", and the like, as used herein, are intended to indicate a presence of a corresponding characteristic (e.g., a number, a function, an operation, or a component such as a component), and should be understood that there are additional possibilities of one or more other characteristics.

In the disclosure, the expressions "A or B", "A and/or B", "one or more of A and/or B", and the like may include all possible combinations of items enumerated together. For example, "A or B", "at least one of A and B", or "at least one of A or B" may indicate all cases where: (1) at least one A is included; (2) at least one B is included; and (3) at least one A and at least one B are both included.

Although expressions such as "$1^{st}$", "$2^{nd}$", "first", and "second" may be used in the disclosure to express various components, it is not intended to limit the corresponding components. The above expressions may be used to distinguish one component from another component. For example, a $1^{st}$ user device and a $2^{nd}$ user device are both user devices, and indicate different user devices. Additionally, a $1^{st}$ component may be termed a $2^{nd}$ component, and similarly, the $2^{nd}$ component may be termed the $1^{st}$ component without departing from the scope of the disclosure.

When a certain component (e.g., the $1^{st}$ component) is described as being "operatively or communicatively coupled with/to" or "connected to" a different component (e.g., the $2^{nd}$ component), it is to be understood that the certain component is directly coupled with/to another component or can be coupled with/to the different component via another component (e.g., a $3^{rd}$ component). On the other hand, when the certain component (e.g., the $1^{st}$ component) is mentioned as being "directly coupled with/to" or "directly connected to" the different component (e.g., the $2^{nd}$ component), it may be understood that another component (e.g., the $3^{rd}$ component) is not present between the certain component and the different component.

The expression "configured to", as used herein, may be interchangeably used with, for example, "suitable for", "having the capacity to", "designed to", "adapted to", "made to", or "capable of" according to a situation. The term "configured to" may not imply only "specially designed to" in a hardware manner. Instead, in a certain situation, an expressed "a device configured to" may imply that the device is "capable of" together with other devices or components. For example, "a processor configured to perform A, B, and C" may imply a dedicated processor (e.g., an embedded processor) for performing a corresponding operation or a generic-purpose processor (e.g., central processing unit (CPU) or an application processor (AP)) capable of performing corresponding operations by executing one or more software programs stored in a memory device.

Terms used herein are for the purpose of describing particular embodiments only and are not intended to limit other embodiments. A singular expression may include a plural expression unless there is a contextually distinctive difference. Unless otherwise defined, all terms (including technical and scientific terms) used herein have the same meanings as those commonly understood by those ordinarily skilled in the art disclosed in the disclosure. It will be further understood that terms, such as those defined in commonly used dictionaries, should be interpreted as having meanings that are consistent with their meanings in the context of the relevant art, and will not be interpreted in an idealized or overly formal sense unless expressly so defined herein. Optionally, the terms defined in the disclosure should not be interpreted to exclude the embodiments of the disclosure.

An electronic device according to various embodiments may include, for example, at least one of a smart phone, a tablet PC, a mobile phone, a video phone, an e-book reader, a desktop PC, a laptop PC, a netbook computer, a workstation, a server, a PDA, a Portable Multimedia Player (PMP), an MP3 player, a mobile medical device, a camera, and a wearable device. According to various embodiments, the wearable device may include at least one of an accessory-type device (e.g., a watch, a ring, a bracelet, an anklet, a necklace, glasses, contact lenses, or a Head-Mounted Device (HMD)), a fabric- or clothes-integrated device (e.g., electronic clothes), a body attaching-type device (e.g., a skin pad or tattoo), or a body implantable device (e.g., an implantable circuit).

According to some embodiments, the electronic device may be a home appliance. The home appliance may include, for example, at least one of a TV, a Digital Versatile Disc (DVD) player, an audio player, a refrigerator, an air conditioner, a cleaner, an oven, a microwave oven, a washing machine, an air purifier, a set-top box, a home automation control panel, a security control panel, a TV box, a game console, an electronic dictionary, an electronic key, a camcorder, and an electronic picture frame.

According to other embodiments, the electronic device may include at least one of various medical devices (e.g., various portable medical measuring devices (e.g., a blood sugar measuring device, a heartrate measuring device, a blood pressure measuring device, a body temperature measuring device, etc.), magnetic resonance angiography (MRA), magnetic resonance imaging (MRI), computed tomography (CT), imaging equipment, ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, an automatic teller machine (ATM), point of sales (POS) device, and Internet of things device (e.g., a light bulb, various sensors, an electric or gas meter, a sprinkler device, a fire alarm, a thermostat, a streetlamp, a toaster, a fitness equipment, a hot water tank, a heater, a boiler, etc.).

According to some embodiments, the electronic device may include at least one of furniture or a part of buildings/constructions, an electronic board, an electronic signature input device, a projector, and various measurement machines (e.g., water supply, electricity, gas, propagation measurement machine, etc.). In various embodiments, the electronic device may be one or more combinations of the aforementioned various devices. According to some embodiments, the electronic device may be a flexible device. Further, the electronic device according to an embodiment is not limited to the aforementioned devices, and may include a new electronic device depending on technical progress.

The term "user", as used herein, may refer to a person who uses the electronic device or a device (e.g., an artificial intelligence (AI) electronic device) which uses the electronic device.

Hereinafter, various embodiments are described in detail with reference to the accompanying drawings. However, for convenience of explanation, constitutional elements may be exaggerated or reduced in size in the drawings. For example, a size and thickness of each constitutional element shown in the drawings are arbitrarily shown for convenience of explanation, and thus, the present disclosure is not necessarily limited thereto.

FIG. 1 is a diagram illustrating a functional structure of an electronic device, according to an embodiment. An electronic device 100 may correspond to at least one of a smart phone, a smart pad, a tablet PC, a PDA, a laptop PC, and a desktop PC. The electronic device 100 may correspond to a wearable device including at least one of an accessory-type device (e.g., a watch, a ring, a bracelet, an anklet, a necklace, glasses, contact lenses, or a HMD), a fabric- or clothes-integrated device (e.g., electronic clothes), a body attaching-type device (e.g., a skin pad or tattoo), or a body implantable device (e.g., an implantable circuit). The electronic device 100 may be a home appliance such as a refrigerator, a TV, a cleaner, an air-conditioner, a washing machine, and an illumination device. The electronic device 100 includes a processor 110, a memory 120, a flexible display 130, a sensor module 140, and a communication circuit 150.

The processor 110 may execute one or more instructions stored in the memory 120. The processor 110 may include a circuit for processing data, for example, at least one of an integrated circuit (IC), an arithmetic logic unit (ALU), a field programmable gate array (FPGA), and a large scale integration (LSI). The memory 120 may store data associated with the electronic device 100. The memory 120 may include a volatile memory such as a random access memory (RAM) including a static random access memory (SRAM), a dynamic RAM (DRAM), or the like, or may include a non-volatile memory such as a flash memory, an embedded multi-media card (eMMC), a solid state drive (SSD), or the like as well as a read only memory (ROM), a magnetoresistive RAM (MRAM), a spin-transfer torque MRAM (STT-MRAM), a phase-change RAM (PRAM), a resistive RAM (RRAM), and a ferroelectric RAM (FeRAM).

The memory 120 may store an instruction associated with an application and an instruction associated with an operating system (OS). The OS is system software executed by the processor 110. The processor 110 may manage hardware components included in the electronic device 100 by executing the OS. The OS may provide an application programming interface (API) as an application which is the remaining software other than the system software.

One or more applications may be installed in the memory 120 as a set of a plurality of applications. When it is said that the application is installed in the memory 120, this means that the application is stored in a format that can be executed by the processor 110 coupled to the memory 120.

The electronic device 100 may visualize information on the flexible display 130, based on instructions stored in the memory 120. The flexible display 130 may visually output the information to a user by using at least one of organic light emitting diodes (OLED), liquid crystal display (LCD), and light emitting diodes (LED). The OLED may include an active matrix OLED (AMOLED).

At least part of the flexible display 130 may be bent by the user of the electronic device 100. A housing of the electronic device 100 may include, for example, one or more hinges, and thus may be bent according to a user's action of bending the flexible display 130. A printed circuit board (PCB) on which hardware components (e.g., the processor 110, memory 120, and/or communication circuit 150 of FIG. 1) included in the electronic device 100 are disposed may include a member which can be bent by external force, and thus, may be bent according to the user's action of bending the flexible display 130.

The sensor module 140 may output various electronic signals associated with a surrounding environment. The sensor module 140 includes a touch sensor 141 and a bending sensor 142. The touch sensor 141 may be disposed on the flexible display 130 so that the user of the electronic device 100 can more intuitively control a UI output via the flexible display 130. The touch sensor 141 may detect a location of an object (e.g., a user's finger, a stylus) which touches the flexible display 130 by using at least one of a resistive film, capacitive components, a surface acoustic wave, and an infrared or which hovers on the flexible display 130. The touch sensor 141 may transmit, to the processor 110, data including the location and/or type of the object detected on the flexible display 130.

The flexible display 130 may be rolled like paper. The processor 110 may decide whether the rolling is achieved by using data received from the bending sensor 142. One or more bending sensors 142 may be disposed on the flexible display 130 to measure a location and/or bending angle of a bending portion of the flexible display 130. The rolling implies a state where the flexible display 130 is rolled. The rolling of the flexible display 130 may be detected based on the bending angle measured from the bending sensor 142.

According an embodiment, the rolling may imply a state where bending of the flexible display 130 is detected to be greater than or equal to a designated bending angle across a specific region. Folding may imply a state where bending is detected to be less than the designated bending angle in a relatively smaller region compared to the rolling. The rolling and/or the folding may be decided based on not only the bending angle but also a radius of curvature of the flexible display 130. The rolling may imply a state where a rolling cross-section of the flexible display 130 has a substantially circular or oval shape. An operation in which the bending sensor 142 detects the rolling of the flexible display 130 is described in greater detail below with reference to FIG. 2A and FIG. 2B.

The communication circuit 150 may couple the electronic device 100 to another external electronic device and/or network, based on a wireless network such as Bluetooth, wireless fidelity (WiFi), near field communication (NFC), long term evolution (LTE), and a wired network such as local area network (LAN), Ethernet. The communication circuit 150 may include at least one or a communication modem supporting the wireless network or the wired network, a communication processor (CP), and/or a communication interface.

The electronic device 100, according to an embodiment, may adjust a format and/or size of a UI that is output on the flexible display 130, in response to a user's action of changing a shape of the flexible display 130. For example, if the user rolls or unrolls the flexible display 130 about a designated rolling axis, the electronic device 100 may output the UI, based on a size of a portion of the flexible display 130, which is not covered by the user due to the rolling of the flexible display 130. If the size is increased (i.e., if the flexible display 130 is further unrolled by the user), the electronic device 100 may output the UI on the further unrolled portion of the flexible display 130, based on a user's gesture performed on the flexible display 130.

When the user unrolls the flexible display 130 by using the rolling axis of the flexible display 130, the electronic device 100 may output a new UI in an unrolled portion without moving a portion of the flexible display 130 that is being viewed by the user, or may output, in an expanded manner, the UI output in the portion.

Since a display region is expanded to the unrolled portion without moving the UI displayed on the flexible display 130, which is being viewed by the user, the electronic device 100 may provide a user eXperience (UX) through which the user can easily control the flexible display 130 depending on context for executing an application. Since the portion of the flexible display 130 that is being viewed by the user is not moved, the user may perform an additional interaction with an additionally unrolled portion while maintaining an interaction in the portion being viewed.

Figure 2A:
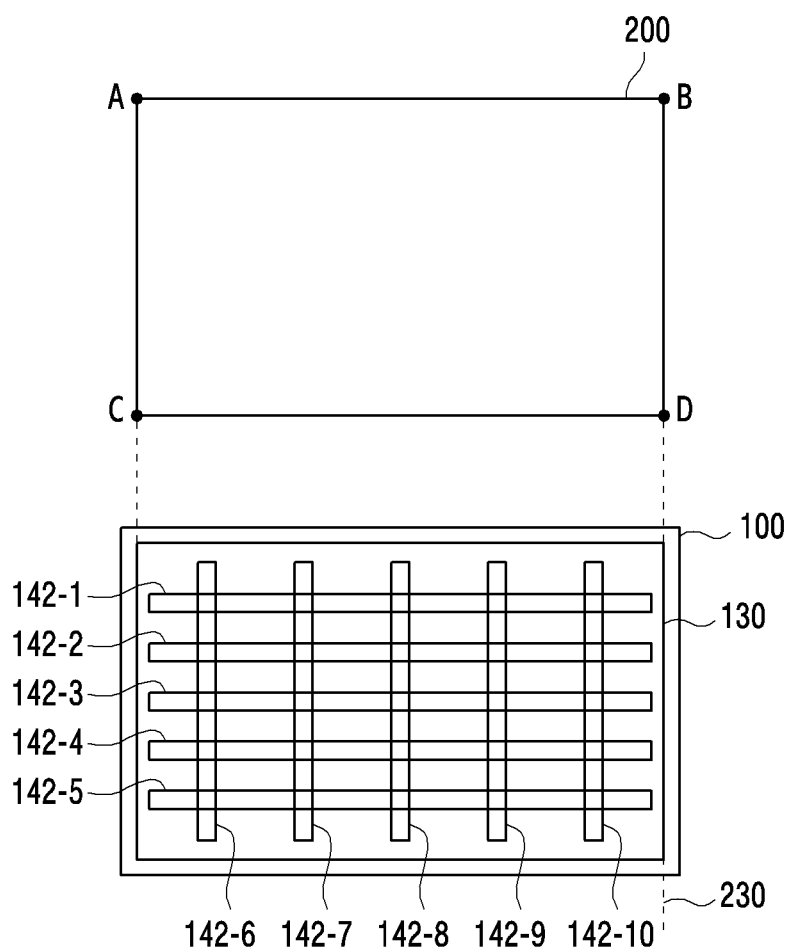
FIG. 2A is a diagram illustrating an action of changing a shape of an electronic device by a user of the electronic device, according to an embodiment.
Figure 2B:
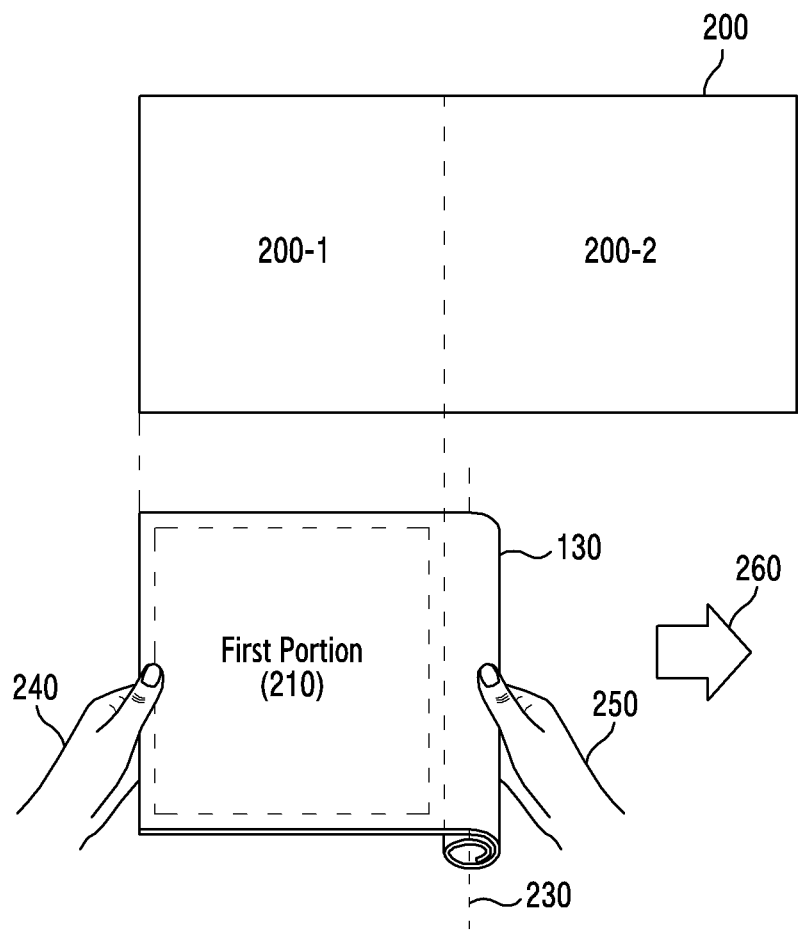
FIG. 2B is a diagram illustrating an action of changing a shape of an electronic device by a user of the electronic device, according to an embodiment.
Figure 2C:
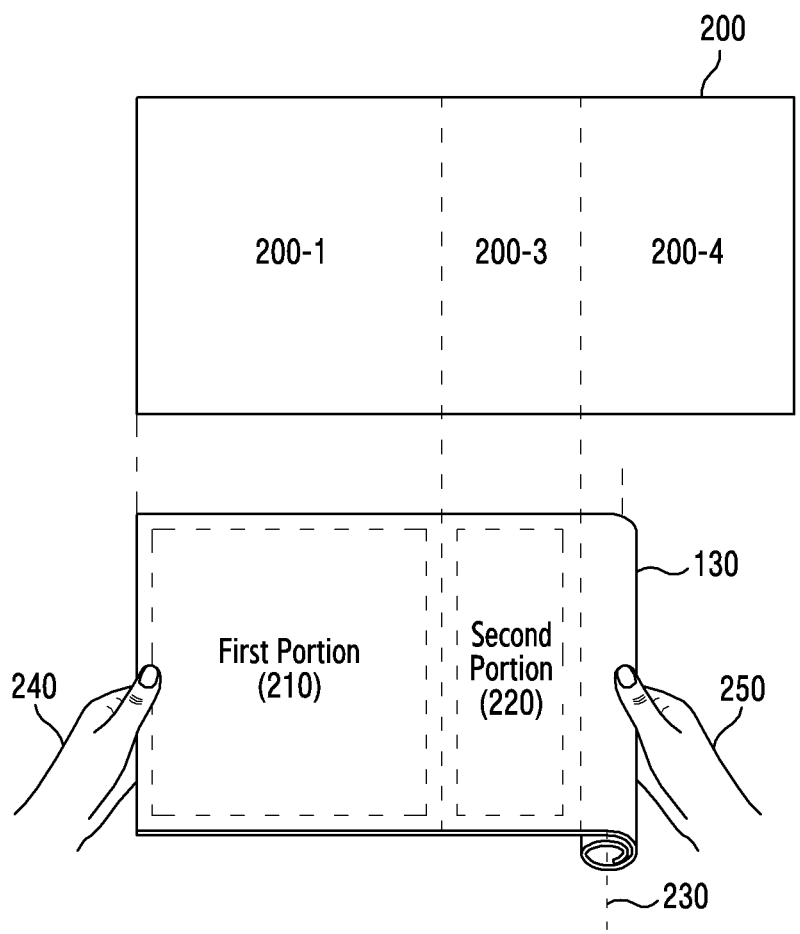
FIG. 2C is a diagram illustrating an action of changing a shape of an electronic device by a user of the electronic device, according to an embodiment.

FIG. 2A to FIG. 2C are diagrams illustrating an action of changing a shape of an electronic device by a user of the electronic device, according to an embodiment. The electronic device 100 of FIG. 2A and FIG. 2B corresponds to the electronic device 100 of FIG. 1.

Referring to FIG. 2A, a plurality of bending sensors 142-1, 142-2, 142-3, 142-4, 142-5, 142-6, 142-7, 142-8, 142-9, and 142-10 are disposed in a housing of the electronic device 100 and/or the flexible display 130. The plurality of bending sensors 142-1 to 142-10 may be implemented in the form of an electrical resistive sensor using electrical resistance or a microfiber sensor using a strain rate of an optical fiber. Hereinafter, for convenience of explanations, it will be assumed that the bending sensor is implemented as the electric resistive sensor.

For example, when a user rolls the electronic device 100 about a center of a rolling axis 230, which is a designated axis corresponding to any one of left and right edges, tension caused by a shape change of the electronic device 100 may be applied to the bending sensors 142-1 to 142-5 disposed in a horizontal direction. A resistance value of the bending sensors 142-1 to 142-5 may vary depending on the tension. The electronic device 100 may detect that the flexible display 130 and/or the electronic device 100 are rolled about the rolling axis 230, based on a change in an output value which is output from the plurality of bending sensors 142-1 to 142-10.

For example, bending of the electronic device 100 shall be achieved to be greater than or equal to a specific curvature to perform the rolling. When the rolling is performed, unlike in a case where a portion of the electronic device 100 is simply bent or folded, a bending region of the electronic device 100 is constituted to be greater. The electronic device 100 may detect a rolling state of the flexible display 130, based on whether bending is greater than or equal to a specific size and a specific bending angle is continuously detected in the flexible display 130.

In the rolling state, front and rear faces of the flexible display 130 may be in contact with each other. For example, when the electronic device 100 is rolled about the rolling axis 230 so that the flexible display 130 is not viewable to the outside, at least some portions of the flexible display 130 may be in contact with each other. The electronic device 100 may detect the rolling state of the flexible display 130, based on whether the at least some portions of the flexible display 130 are in contact with each other. In this case, the electronic device 100 may use a touch sensor 141. According to another embodiment, the electronic device 100 may determine whether at least some portions of the flexible display 130 are in contact with each other, by using a magnetic sensor, a magnetic-field sensor, an optical sensor, a proximity sensor, or the like, instead of the touch sensor.

Referring to FIG. 2A, a display region 200 of the flexible display 130 is a region in which a plurality of pixels included in the flexible display 130 are disposed. The display region 200 may be associated with a virtual region (e.g., a frame buffer) used by the electronic device 100 to display a UI based on an application. A size of the display region 200 may correspond to a size of the flexible display 130. The display region 200 may be used to activate and/or deactivate at least part of at least one sensor (e.g., the bending sensors 142-1 to 142-10, the touch sensor 141) disposed on the flexible display 130.

Each of the plurality of pixels included in the flexible display 130 may be identified based on a coordinate value uniquely allocated based on a location of the pixel in the display region 200. For example, a coordinate value of a pixel at a point A of FIG. 2A may correspond to (0, 0). A coordinate value of a pixel at a point B of FIG. 2A may correspond to (w−1, 0), when w pixels are disposed along a direction of width of the flexible display 130. A coordinate value of a pixel at a point C of FIG. 2A may correspond to (0, h−1), when h pixels are disposed along a direction of height of the flexible display 130. A coordinate value of a pixel at a point D of FIG. 2A may correspond to (w−1, h−1). The electronic device 100 may output a UI of an application, based on the point A corresponding to the coordinate value (0, 0).

In the electronic device 100, the rolling axis 230, which is a rolling center of the flexible display 130, may be disposed at an opposite side of the point A which is a reference of an output of the UI (or an axis or line segment connecting the point A and the point B). For example, the rolling axis 230 may correspond to a line segment connecting the point B to the point D. Since the rolling axis 230 is disposed to an opposite side of the point A, when the user of the electronic device 100 rolls at least part of the flexible display 130 about the rolling axis 230, the electronic device 100 may maintain the display of the UI without moving the UI in parallel in the display region 200. Since the UI is not moved in parallel in the display region 200, before and after the user rolls at least part of the flexible display 130 about the rolling axis 230, the user may perform the same interaction with the electronic device 100 by touching the same portion of the display region 200.

Referring to FIG. 2B, the user of the electronic device 100 rolls a portion of the flexible display 130 by using two hands 240 and 250. The user may roll a portion of the flexible display 130 about the rolling axis 230 by using the two hands 240 and 250. Since the flexible display 130 is rolled about the rolling axis 230, a first portion 210 of the flexible display 130 may be unrolled, and the remaining portions other than the first portion 210 may be bent.

The electronic device 100 may display a UI based on a plurality of pixels included in a portion 200-1 corresponding to the first portion 210 unrolled by the user among the plurality of pixels included in the display region 200. For example, the electronic device 100 may identify a UI based on a frame buffer associated with the plurality of pixels included in the portion 200-1, from an application being executed. The identified UI may be disposed on the first portion 210. For example, the electronic device 100 may activate a portion corresponding to the first portion 210 of the touch sensor, and may deactivate the remaining portions other than the first portion 210. An interaction between the user and the electronic device 100 may occur, based on the activated portion of the touch sensor.

While the UI, based on the size of the first portion 210, is displayed in the first portion 210, the user may unroll the flexible display 130 by using the hand 250 close to the rolling axis 230. For example, the user may move the hand 250 along a direction 260 to further unroll the flexible display 130. The electronic device 100 may identify a user input for unrolling the flexible display 130, by using one or more bending sensors and/or touch sensors.

Referring to FIG. 2C, a user unrolls the flexible display 130 by using the hand 250 close to the rolling axis 230 in a state of the flexible display 130 of FIG. 2B. Since the user further unrolls the flexible display 130, a second portion 220 adjacent to the first portion 210 may be further unrolled, and the remaining portions (e.g., a portion 200-4 of the display region 200) other than the first portion 210 and the second portion 220 may be bent. Since the second portion 220 is further unrolled, the electronic device 100 may activate a plurality of pixels corresponding to the second portion 200 (e.g., a plurality of pixels included in a portion 200-3). The electronic device 100 may further activate a portion corresponding to the second portion 220 of the touch sensor. An interaction between the user and the electronic device 100 may occur, based on a portion of the touch sensor corresponding to the first portion 210 and the second portion 220.

The electronic device 100 may identify the second portion 220 additionally unrolled by the user, by using one or more bending sensors and/or touch sensors. The electronic device 100 may display a different UI distinct from the UI by using a plurality of pixels included in the portion 200-3 of the display region 200 corresponding to the second portion 220, while maintaining the displaying of the UI by using a plurality of pixels included in the portion 200-1 corresponding to the first portion 210. The different UI may be displayed based on a user's gesture for the UI displayed in the first portion 210.

Since the rolling axis 230 is disposed at an opposite side of the first portion 210 in which the UI is displayed, the displaying of the UI of the first portion 210 may be maintained, and the user may maintain an interaction performed on the UI in the first portion 210. For example, a gesture performed on the UI of the first portion 210 based on the hand 240 may be performed regardless of the hand 250, which unrolls the flexible display 130. For example, the electronic device 100 may identify the second portion 220 unrolled by the hand 250 or display the different UI distinct from the UI of the first portion 210 on the second portion 220, while controlling the UI of the first portion 210 based on the gesture performed on the UI of the first portion 210 with the hand 240. Hereinafter, an operation of the electronic device 100, which expands the UI of the first portion 210 in an unrolled portion of the flexible display 130 expanded by the user's gesture, is described in greater detail below.

Figure 3:
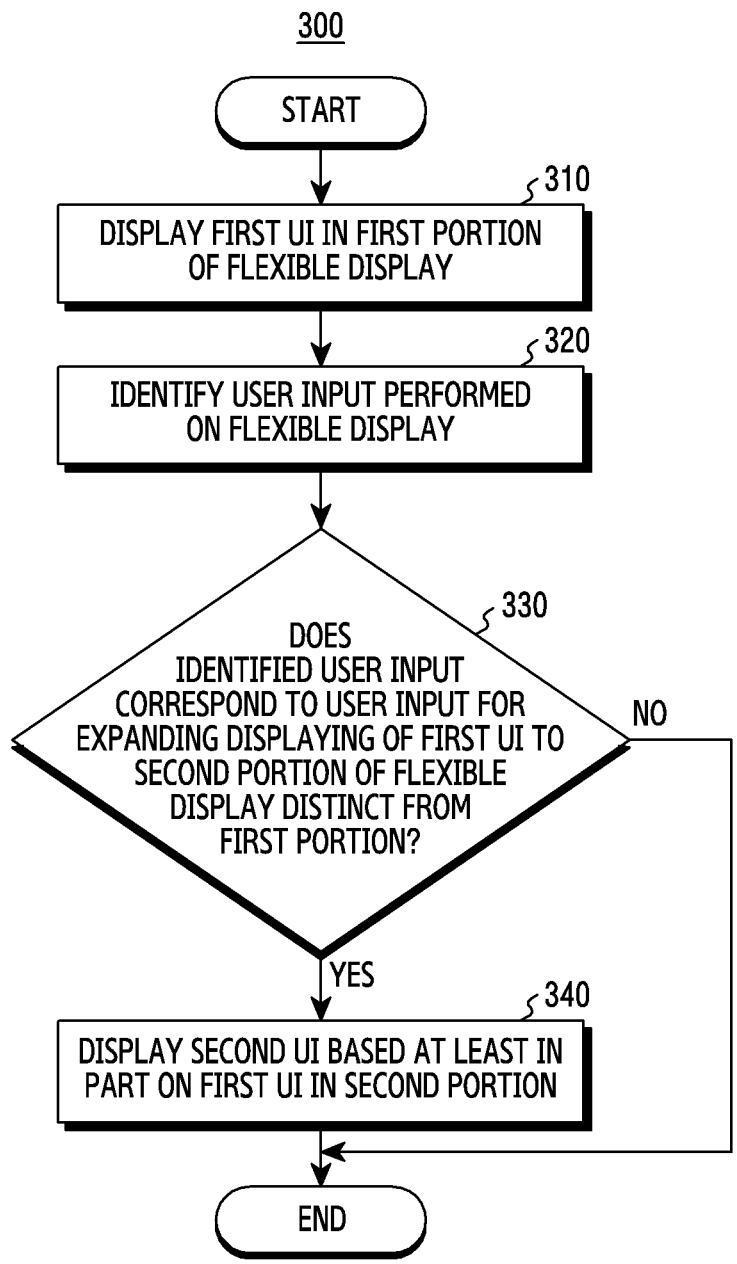
FIG. 3 is a flowchart illustrating an operation of an electronic device, according to an embodiment.

FIG. 3 is a flowchart illustrating an operation of an electronic device, according to an embodiment. The electronic device of FIG. 3 may correspond to the electronic device 100. A plurality of operations of FIG. 3 may be performed, for example, by the electronic device 100, and/or the processor 110.

Referring to a flowchart 300 of FIG. 3, in operation 310, an electronic device displays a first UI in a first portion of a flexible display. The first portion may be included in an unrolled portion of the flexible display. For example, the first portion may correspond to a first portion 210. The first UI may be executed by an operating system and/or application being executed in the electronic device, based on a size of the first portion 210 of the flexible display. Among a plurality of pixels included in the flexible display, pixels corresponding to the first portion may be selectively activated. When a touch sensor is disposed on the flexible display, a portion of the touch sensor corresponding to the first portion may be partially activated.

Referring to FIG. 3, in operation 320, the electronic device identifies a user input performed on the flexible display. The electronic device may identify the user input associated with the flexible display, in a state displaying a first UI in the first portion. A user may perform various inputs for controlling the first UI, the flexible display, and/or the electronic device, while the first UI is displayed in the first portion of the flexible display.

The user input may include a gesture for changing a size of an unrolled portion of the flexible display (e.g., a user's gesture illustrated in FIG. 2B to FIG. 2C). For example, in a state displaying the first UI in the first portion 210, the electronic device may identify a gesture for expanding the unrolled portion by using at least one sensor 142. For example, the gesture may correspond to a gesture for moving the hand 250 holding the flexible display 130 along the direction 260 of FIG. 2B. While identifying the gesture for unrolling the flexible display, the displaying of the first UI may be maintained. For example, while the user performs the gesture, the first UI may be continuously displayed in the unrolled portion (a first portion) of the operation 310. In response to identifying of the gesture for expanding the unrolled portion of the flexible display, the electronic device may identify a portion corresponding to additionally unrolled portion according to the first user input in the flexible display. The additionally unrolled portion may correspond to the second portion 220 of FIG. 2C.

The user input may include the gesture for expanding the display of the first UI of the first portion. Referring to FIG. 3, in response to identifying of the user input, in operation 330, the electronic device determines whether the identified user input is a user input for expanding the displaying of the first UI to a second portion of the flexible display, distinct from the first portion. According to an embodiment, the first portion may correspond to the first portion 210, and the second portion may correspond to the second portion 220. The user input for expanding the displaying of the first UI may be associated with the second portion and/or the first portion of the flexible display in which the first UI is displayed. For example, the user input may include a touch gesture for simultaneously touching two points different from each other in a portion of the flexible display in which the first UI is displayed. The user input for expanding the display of the first UI is described in greater detail with reference to FIG. 4A and FIG. 4B.

If the identified user input is a user input for expanding the display of the first UI to the second portion (Yes in operation 330), in operation 340, the electronic device displays the second UI based at least in part on the first UI in the second portion. In response to identifying of the user input, in a state displaying the first UI in the first portion 210 of FIG. 2C, the electronic device displays the second UI based at least in part on the first UI in the second portion 220. The second UI may include information associated with a visual element in the first UI selected by the user input. The visual element is a figure used to visualize information, and may include a text, an image, a video, an animation, and/or a shape. The second UI displayed by the operation 340 may be identified by an operating system and/or application associated with the first UI. Various examples of the second UI are described in greater detail below with reference to FIG. 6A to FIG. 6C, FIG. 8, FIG. 10A, FIG. 10B, FIG. 12, and FIG. 13.

If the identified user input is not the user input for expanding the display of the first UI to the second portion (No in operation 330), the electronic device executes a function based on a type of the user input, or may display a different UI distinct from the first UI in the second portion. Hereinafter, examples of the user input for expanding the displaying of the first UI to the second portion are described in greater detail with reference to FIG. 4A and FIG. 4B.

Figure 4A:
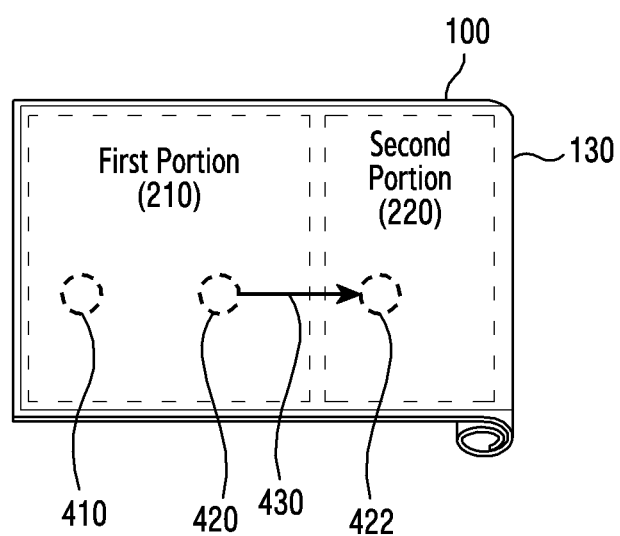
FIG. 4A is a diagram illustrating a type of a user's gesture performed on a flexible display of an electronic device to expand a region in which a UI is displayed, according to an embodiment.
Figure 4B:
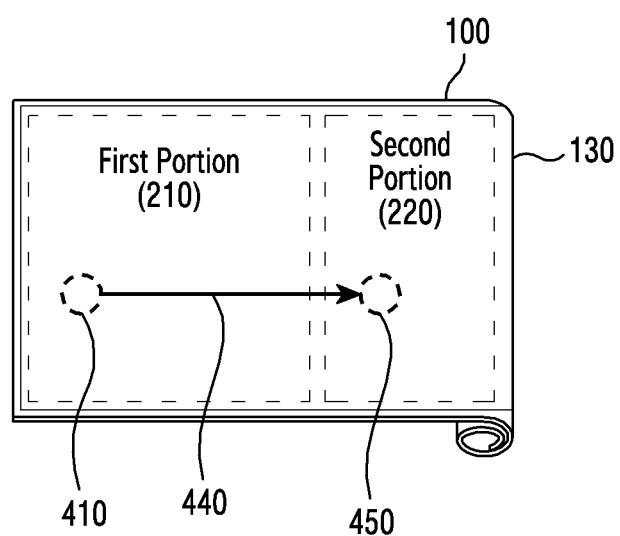
FIG. 4B is a diagram illustrating a type of a user's gesture performed on a flexible display of an electronic device to expand a region in which a UI is displayed, according to an embodiment.

FIG. 4A and FIG. 4B are diagrams illustrating a type of a user's gesture performed on the flexible display of the electronic device to expand a region in which a UI is displayed, according to various embodiments. The electronic device 100 of FIG. 4A and FIG. 4B may correspond to the electronic device 100 of FIG. 2A to FIG. 2C. The electronic device 100 of FIG. 4A and FIG. 4B may perform at least one of operations of FIG. 3. The gesture of FIG. 4A and FIG. 4B may be associated with a user input for expanding the display of the first UI of FIG. 3.

Referring to FIG. 4A, an exemplary situation is provided after the action of FIG. 2C. For example, in a state where the first portion 210 of the flexible display 130 is unrolled, a user may further unroll the second portion 220 of the flexible display 130 rolled about a rolling axis as shown in FIG. 2B. While the second portion 220 is further unrolled, displaying of the first UI may be maintained in the first portion 210. The user may perform an interaction for displaying the UI on the second portion 220. For example, the interaction may include a touch gesture (e.g., a multi-touch) using one or more fingers, a pressure gesture for pressing the flexible display 130 with at least a designated pressure, and an action of executing a function associated with security authentication such as fingerprint authentication. In response to the interaction, the electronic device 100 may acquire a UI to be displayed on the second portion 220, based on information (e.g., context-based information) associated with a UI (e.g., the first UI displayed in the first portion 210), which is being displayed on the flexible display 130.

Referring to FIG. 4A, an example of a multi-touch-based gesture is illustrated as an interaction for displaying a UI on the second portion 220. For example, a user of the electronic device 100 may touch a first point 410 and a second point 420 at the same time in the first portion 210 in which the first UI is displayed. The first point 410 and the second point 420 may be points distinct from each other in the first portion 210. In a state where the first point 410 is touched by any one finger, the user of the electronic device 100 may drag another finger which touches the second point 420 from the second point 420 to a third point 422 in the second portion 220 along a path 430. The third point 422 may be included in the second portion 220, or may be included in a portion within a designated distance with respect to a boundary between the first portion 210 and the second portion 220.

A user input for expanding displaying of the first UI of FIG. 3 and/or the user input for displaying the UI on the second portion 220 may include a drag gesture for touching the first point 410 and a drag gesture starting at the second point 420 and ending at the third point 430 distinct from the first point 410 and the second point 420 while maintaining the touch of the first point 410, caused by the touch gesture. The touch gesture and the drag gesture may be performed by at least partially overlapping in a time domain, and a starting time and an ending time may not be exactly matched to each other. The order between the touch gesture and the drag gesture may not be limited to the aforementioned example.

In response to identifying of the user input for displaying the UI on the second portion 220, the electronic device 100 may expand the first UI displayed in the first portion 210 and display it on the second portion 220, or may display the second UI based at least in part on an application associated with the first UI. The electronic device 100 may expand a region in which content is displayed in the flexible display 130 by the user input. The second UI may be associated with at least one visual element in the first UI selected by the touch gesture for touching the first point 410. An operation in which the electronic device 100 identifies the second UI based on the user input is described in greater detail below with reference to FIG. 5 to FIG. 6.

Referring to FIG. 4B, an example of a gesture based on a single touch is illustrated as an interaction for displaying the UI on the second portion 220. For example, the user of the electronic device 100 may touch the first point 410 at which the first UI is displayed for at least a designated time (e.g., a long touch) by using any one finger, and thereafter move the finger along a path 440 to drag the finger from the first point 410 to a fourth point 450 in the second portion 220.

After a touch gesture maintained on the first point 410 for the designated time, in response to identifying of the drag gesture consecutive to the touch gesture and moving from the first point 410 to the fourth point 450, the electronic device 100 may expanded and display the first UI displayed in the first portion 210, or may display the second UI based at least on an application associated with the first UI.

Referring to FIG. 4A, if a finger which moves along the paths 430 does not end in the second portion 220 or within a designated distance (e.g., an edge region in a direction in which the flexible display 130 can be expanded in the first portion 210) from a boundary between the first portion 210 and the second portion 220, the electronic device 100 may perform an operation associated with the first UI displayed in the first portion 210. For example, if it ends in the first portion 210, the electronic device 100 may perform the operation associated with the first UI displayed in the first portion 210, instead of displaying the second UI in the second portion 220. For example, the electronic device 100 may perform a pre-set function in the first UI such as pinch-to-zoom. Hereinafter, an operation in which the electronic device 100 displays the second UI in the second portion 220 will be described in detail in response to the user input of FIG. 4A and FIG. 4B.

Figure 5:
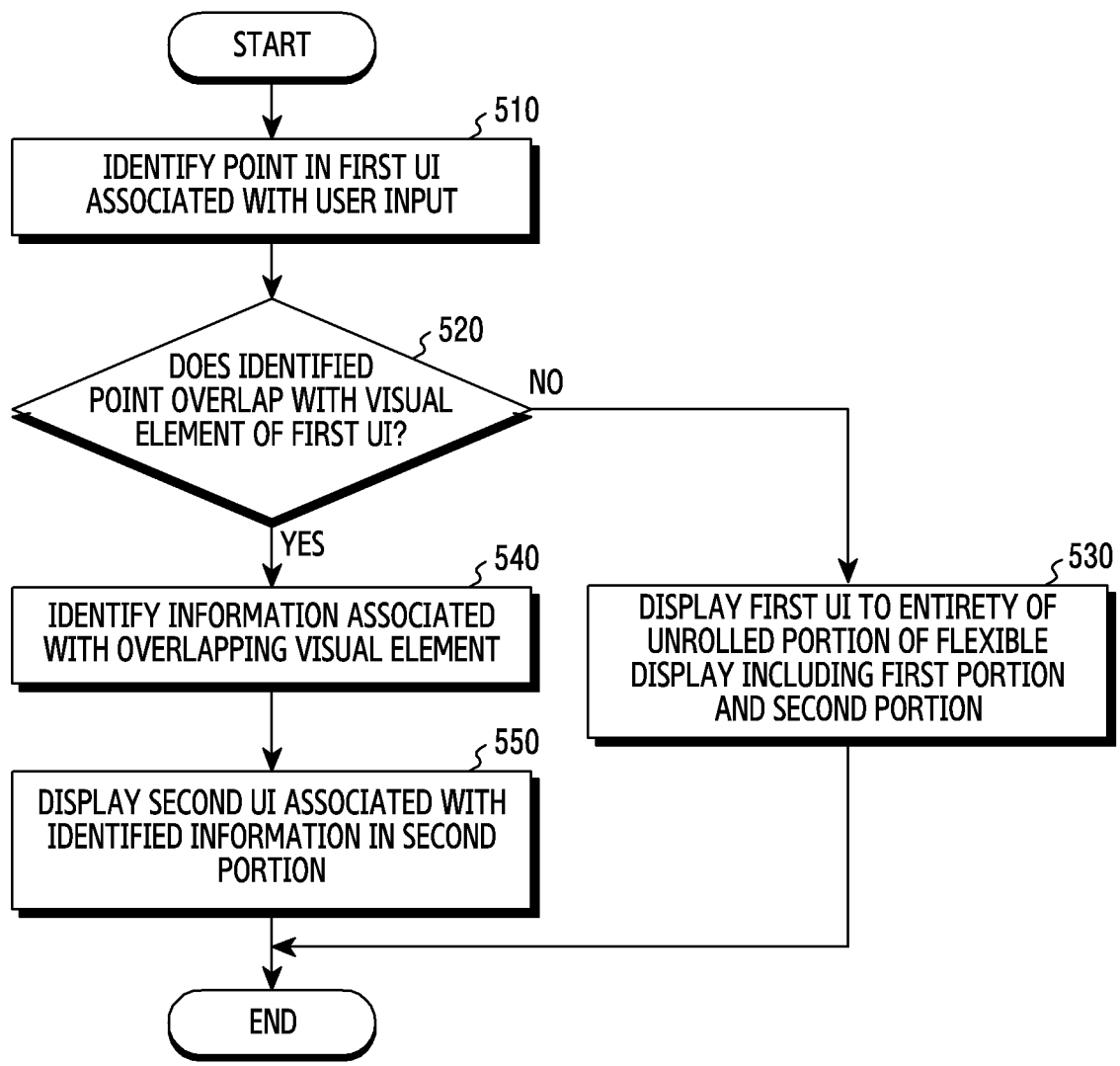
FIG. 5 is a flowchart illustrating an operation of displaying a UI in a portion of a flexible display additionally unrolled by a user's gesture in an electronic device, according to an embodiment.

FIG. 5 is a flowchart illustrating an operation of displaying a UI in a portion of a flexible display additionally unrolled by a user's gesture in an electronic device, according to an embodiment. The electronic device of FIG. 5 may correspond to the electronic device 100 of FIG. 1 and FIG. 2A to FIG. 2C. A plurality of operations of FIG. 5 may be performed, for example, by the electronic device 100 of FIG. 1 and FIG. 2A to FIG. 2C, and/or the processor 110 of FIG. 1. The plurality of operations of FIG. 5 may be associated with the operation 340 of FIG. 3. The user's gesture may be associated with a user input for expanding the displaying of the first UI of FIG. 3 and/or the gesture of FIG. 4A and FIG. 4B.

Referring to a flowchart 340 of FIG. 5, in operation 510, the electronic device identifies a point in the first UI associated with the user input. The user input may include a gesture for expanding the display of the first UI of the first portion. Referring to FIG. 4A, in a state displaying the first UI in the first portion 210 after identifying the second portion 220, the electronic device may identify a user input associated with the first point 410 and second point 420 distinct from each other in the first portion 210. The point may correspond to a start point of the touch gesture of the user input (e.g., the first point 410). The point in the first UI may be associated with at least one visual element included in the first UI and/or a background region of the first UI.

Referring to FIG. 5, in operation 520, the electronic device determines whether the identified point overlaps with a visual element of the first UI. The visual element may be displayed by an application associated with the first UI, and may indicate information based on a text, an image, a video, an animation, and/or a shape. According to an embodiment, in response to identifying of an end point (e.g., the third point 422) of the drag gesture of the user input, the electronic device may identify the visual element displayed in the identified point (e.g., the first point 410), based on the operation 520. If the end point of the user input is included in the second portion (e.g., the second portion 220) corresponding to the first UI and distinct from the first UI or is included in a designated portion including a boundary of the second portion, the electronic device may identify the visual element overlapping with the identified point, based on the operation 520.

If the identified point does not overlap with the visual element of the first UI (No in operation 520), in operation 530, the electronic device displays the first UI in the entirety of an unrolled portion of the flexible display including the first portion and the second portion. For example, the electronic device may process the user input similarly to a zoom-out gesture and/or zoom-in gesture associated with the first UI. A size of the first UI may be increased from a size of the first portion to a size of the entirety of the first portion and second portion, based on the operation 530. Since a region of the flexible display for displaying the first UI is expanded, a size of at least one visual element included in the first UI may also be increased. A magnification of the size of at least one visual element included in the first UI may be based at least in part on the size of the entirety of the first portion and second portion and/or a length of a drag gesture included in the user input.

If the identified point overlaps with the visual element of the first UI (Yes in operation 520), the electronic device identifies information associated with the overlapping visual element. For example, if the first point 410 of FIG. 4A overlaps with the visual element of the first UI, the electronic device may identify the information associated with the overlapping visual element. The information may be information associated with the visual element, and may include additional information not displayed in the first UI and/or the visual element. The information may include information acquired by executing a function associated with the visual element. The information may be associated with a UI (e.g., a popup window) displayed when executing the function associated with the visual element.

In response to identifying information associated with the visual element, in operation 550, the electronic device displays the second UI associated with the identified information in the second portion. Referring to FIG. 4A, in a state displaying the first UI in the first portion 410, the electronic device may display the second UI in the second portion 420, based on the operation 550 of FIG. 5. The second UI may include additional information not displayed by the visual element and information acquired when executing the function associated with the visual element, or may correspond to a UI displayed when executing the function.

The second UI may be based at least in part on an application associated with the first UI. For example, the electronic device may identify the second UI, by executing the function of the application associated with the identified point, based on the operation 510. A size and/or layout of the second UI may be based at least in part on a second portion 220. The electronic device may display the identified second UI in the second portion, in a state displaying the first UI.

As shown in FIG. 4B, upon identifying the user input including a touch gesture for touching the first point 410 for at least a designated time and a drag gesture starting at the first point 410 and ending at the fourth point 450, in response to identifying of the fourth point 450 included in the second portion 220 or included in a designated portion including a boundary between the first portion 210 and the second portion 220, the electronic device may display the second UI having a size of the second portion 220, based on the operation 550.

Hereinafter, a change of content displayed in the flexible display of the electronic device, based on operations of FIG. 5, is described in greater detail with reference to FIG. 6A to FIG. 6C.

Figure 6A:
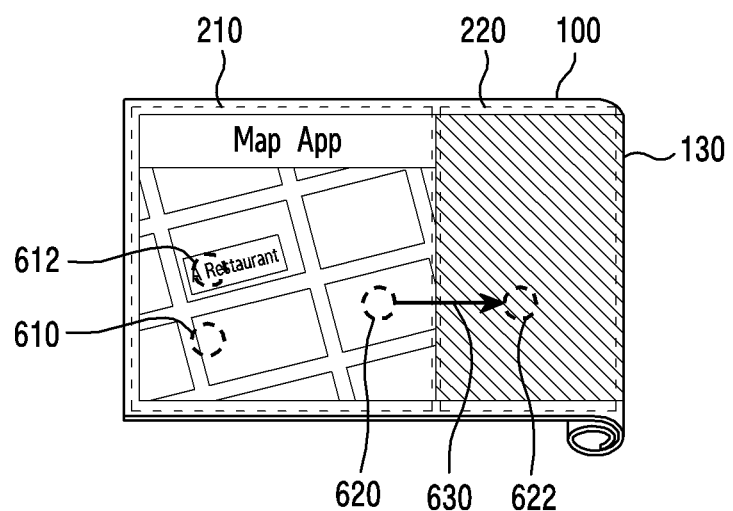
FIG. 6A is a diagram illustrating an operation of displaying at least one UI on a flexible display in response to a user's gesture in an electronic device, according to an embodiment.
Figure 6B:
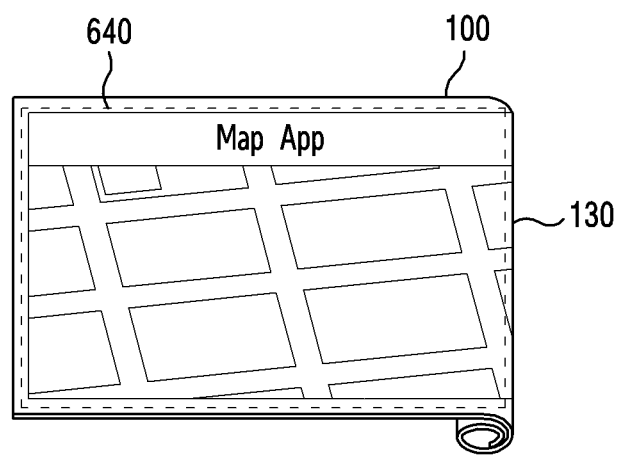
FIG. 6B is a diagram illustrating an operation of displaying at least one UI on a flexible display in response to a user's gesture in an electronic device, according to an embodiment.
Figure 6C:
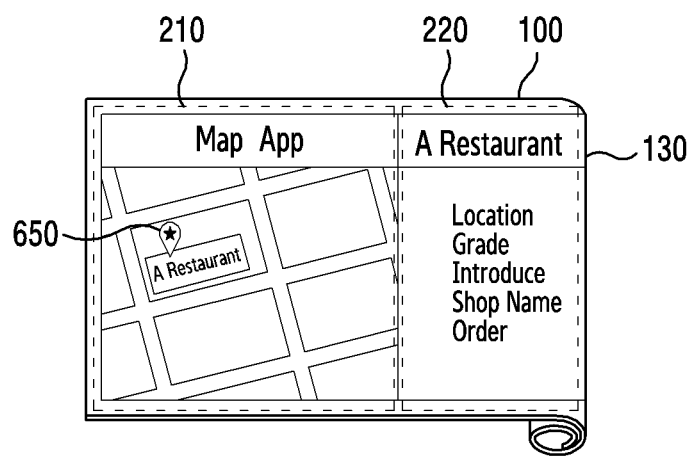
FIG. 6C is a diagram illustrating an operation of displaying at least one UI on a flexible display in response to a user's gesture in an electronic device, according to an embodiment.

FIG. 6A to FIG. 6C are diagrams illustrating an operation of displaying at least one UI on a flexible display in response to a user's gesture in the electronic device, according to various embodiments. The electronic device 100 of FIG. 6A to FIG. 6C may correspond to the electronic device 100 of FIG. 1 and FIG. 2A to FIG. 2C. The electronic device 100 of FIG. 6A to FIG. 6C may perform at least one of operations of FIG. 3 and/or FIG. 5.

Referring to FIG. 6A, in a state displaying a first UI in the first portion 210 of the flexible display 130, a user may perform a gesture of FIG. 2B to further unroll the second portion 220 of the flexible display 130 adjacent to the first portion 210. The first UI may be displayed based on an application being executed in a processor 110 of the electronic device 100. In FIG. 6A, it is assumed that the application is an application for providing a service associated with a map or a location of the user. In response to identifying of the gesture which rolls or unrolls the flexible display 130, the electronic device 100 may identify a size of the second portion 220. In a state where the flexible display 130 is unrolled by the user, the electronic device 100 may maintain the displaying of the first UI in the first portion 210.

Referring to FIG. 6A, in a state where the second portion 220 of the flexible display 130 is unrolled, similarly to FIG. 4A, the user may perform a user input including a touch gesture for touching any one point (e.g., a point 610 or a point 612) of the first portion 210 and a drag gesture starting at a different point (e.g., a point 620) of the first portion 210 and ending at any one point (e.g., a point 622) of the second portion 220. In response to identifying of the user input, the electronic device 100 may display content on the first portion 210 and/or the second portion 220, based on at least one of the operations of FIG. 5. The displayed content may be associated with any one point of the first portion 210 selected by the user input, content of the first UI, and/or a point of interest (POI).

For example, while performing the touch gesture for touching the point 610 associated with a background region of the first UI displayed on the first portion 210, the user may perform the drag gesture starting at the different point 620 of the first portion 210 distinct from the point 610 and ending at the point 622 in the second portion 220 along a path 630. The electronic device 100 may identify the user input including the touch gesture and the drag gesture.

In an embodiment, in a state where the user input is identified, in response to identifying a visual element displayed at the first point 610 and corresponding to the background region of the first UI, the electronic device 100 may display the first UI adjusted by the user input in the entirety of the first portion 210 and the second portion 220. For example, the electronic device 100 may identify that the point 610 selected by the touch gesture is a point associated with the background region. Referring to FIG. 6B, in response to the identification, the electronic device 100 may display the first UI in the entirety of an unrolled portion 640 of the flexible display including both the first portion 210 and the second portion 220, for example, based on the operations 510, 520, and 530 of FIG. 5. If the point 610 selected by the touch gesture is associated with the background region, the electronic device 100 may process the user input similarly to a multi-touch gesture (e.g., a pinch-to-zoom gesture) performed in the first UI. If the point 610 selected by the touch gesture does not overlap with any visual element of the first UI, in response to the drag gesture of the user input for moving to the second portion 220, the electronic device 100 may expand a region in which the first UI is displayed to the entirety of the unrolled portion 640 of the flexible display 130 in the first portion 210. In this case, the user of the electronic device 100 may continuously perform the touch in the second portion 220, and may continuously maintain an interaction between the user and the first UI.

If the UI (e.g., a popup menu, a popup window, a notification message) associated with the point 610 selected by the touch gesture of the user input is not identified, in response to the drag gesture ending in the second portion 220 of the user input, the electronic device 100 may expand a region in which the first UI is displayed to the entirety of the unrolled portion 640 of the flexible display 130 of the first portion 210. If the point 610 selected by the user input is a background region not including designated context information, in response to the user input, the electronic device 100 may extend the region in which the first UI is displayed to the unrolled portion 640 of the flexible display 130.

The second UI displayed in the second portion 220 in response to the user input may be determined based on a visual element and/or object of the first UI selected by the touch gesture of the user input. For example, referring to FIG. 6A, while performing a touch gesture for touching the point 612 associated with any one visual element (e.g., a visual element associated with a specific building and/or place on a map) of the first UI displayed on the first portion 210, the user may perform a drag gesture starting at the different point 620 of the first portion 210 distinct from the point 612 and ending at the point 622 along the path 640. The electronic device 100 may identify that the point 612 selected by the touch gesture is a point associated with any one visual element of the first UI. Referring to FIG. 6C, in response to the identification, for example, based on the operations 510, 520, 540, and 550 of FIG. 5, the electronic device 100 may display the second UI based on the visual element associated with the point 612 in the second portion, in a state displaying the first UI in the first point.

In response to the displaying of the second UI, the electronic device 100 may change the first UI, which is output on the first portion 210. For example, the electronic device 100 may further display a different visual element 650 adjacent to a visual element associated with the user input in the first UI (e.g., a visual element associated with the first point 650 associated with the touch gesture of the user input). The operation in which the electronic device 100 changes the first UI may be performed, unlike in FIG. 6, by the application associated with the first UI.

Content displayed in the second portion 220 and/or the second UI may be associated with an object and/or visual element associated with the point 612 selected by the touch gesture of the user input. Referring to FIG. 6C, the second UI may include an attribute and/or information associated with a specific building and/or place associated with the point 612. The second UI may be a popup window provided by the object and/or visual element associated with the point 612. If only the touch gesture for touching the point 612 is performed without the drag gesture of the user input, the second UI may be displayed in an overlay manner on part of the first portion 210 adjacent to the point 612.

According to an embodiment, the electronic device 100 may identify information associated with the point 612 selected by the touch gesture of the user input, based on an application associated with the first UI. In response to identifying of the information, the electronic device 100 may display the identified information in any one part of the first portion 210 or second portion 220, based on in which portion (i.e., the first portion 210 or the second portion 220) an end point of the drag gesture of the user input is included. For example, if the end point of the drag gesture of the user input is included in the first portion 210, the electronic device 100 may display the second UI associated with the identified information in an overlay manner on the first UI of the first portion 210. For example, if the end point of the drag gesture of the user input is included in the second portion 220, the electronic device 100 may display the second UI associated with the identified information on the second portion 220, in a state displaying the first UI in the first portion 210.

The electronic device 100 may identify a point of interest (POI) (e.g., the point 612 selected by the touch gesture of FIG. 6A) in the first UI of the first portion 210 associated with the user input. In response to the identifying of the POI, the electronic device 100 may acquire information associated with the POI. If the end point of the drag gesture of the user input is included in the second portion 220, the electronic device 100 may display the acquired information on the second portion 220. The user may expand an interaction between the first UI and the user to the second portion 220 which is additionally unrolled after unrolling the first portion 210, based on the user input including the touch gesture and drag gesture associated with the POI in the first UI of the first portion 210.

Additionally, the electronic device 100 may identify a user input for expanding an interaction occurring in any one unrolled portion of the flexible display 130 to another unrolled portion of the flexible display 130. For example, it is possible to identify a user input for reducing the interaction occurring in the entirety of the unrolled portion of the flexible display 130 to part of the unrolled portion of the flexible display 130.

Figure 7:
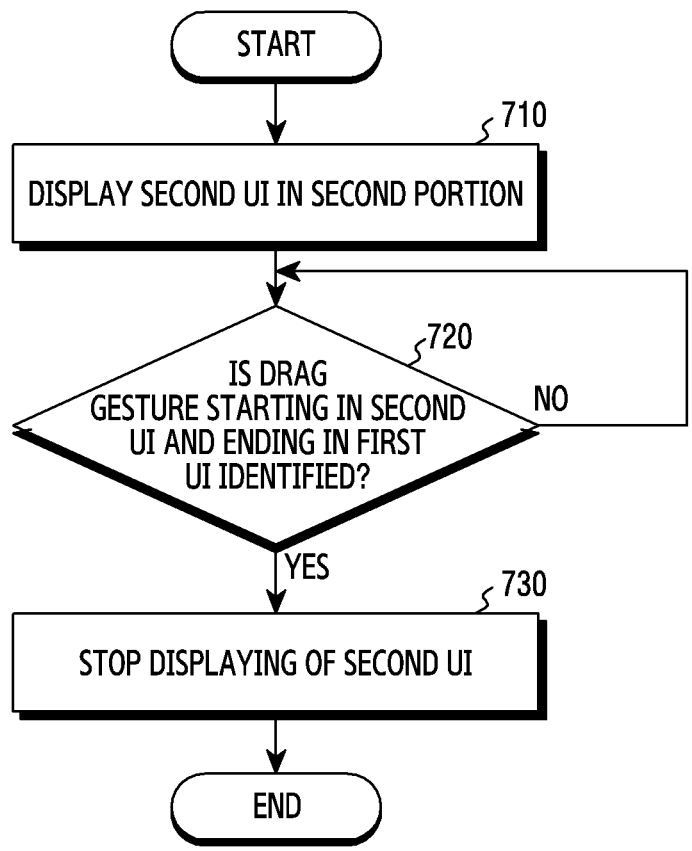
FIG. 7 is a flowchart illustrating an operation of stopping displaying of a second UI in response to a user's gesture in an electronic device, according to an embodiment.

FIG. 7 is a flowchart illustrating an operation of stopping displaying of a second UI in response to a user's gesture in an electronic device, according to an embodiment. The electronic device of FIG. 7 may correspond to the electronic device 100 of FIG. 1 and FIG. 2A to FIG. 2C. A plurality of operations of FIG. 7 may be performed, for example, by the electronic device 100 of FIG. 1 and FIG. 2A to FIG. 2C and/or the processor 110 of FIG. 1. The plurality of operations of FIG. 7 may be associated with the operation 350 of FIG. 3 or may be performed after the operation 350 of FIG. 3.

Referring a flowchart 340-1 of FIG. 7, in operation 710, the electronic device displays a second UI in a second portion distinct from a first portion in which a first UI. The operation 710 may correspond to the operation 340 of FIG. 3. The additionally unrolled portion may correspond to the second portion 220 of FIG. 2C, as a portion unrolled by a user's gesture for expanding the unrolled portion of the flexible display 130 as shown in FIG. 2B. As shown in FIG. 4A and FIG. 4B, the electronic device may perform the operation 710 in response to a user input for expanding displaying of the first UI associated with the entirety of the first portion 210 and second portion 220. In a state displaying the first UI in another portion (e.g., the first portion 210) other than the additionally unrolled portion, the electronic device may display the second UI acquired based on the operation of FIG. 3 or FIG. 5 on a portion additionally unrolled by the user.

After displaying the second UI, in operation 720, the electronic device identifies a drag gesture starting in the second UI and ending in the first UI. A start point of the drag gesture may be included in a background region of the second UI. An end point of the drag gesture may be included in the first UI, or may have a designated distance from a boundary of the first UI and the second UI. The drag gesture is described in greater detail below with reference to FIG. 8.

The drag gesture may correspond to a user input for stopping the displaying of the second UI.

In response to identifying the drag gesture of operation 720, in operation 730, the electronic device stops displaying the second UI. For example, the electronic device may display another UI (e.g., a UI including a home screen and/or a list for executing an application) replacing the second UI in an additionally unrolled portion. The electronic device may deactivate a portion (e.g., the second portion of operation 710) of the flexible display in which the second UI is displayed. The electronic device may deactivate a portion (e.g., the second portion of operation 710) of a touch sensor associated with the flexible display in which the second UI is displayed.

Figure 8:
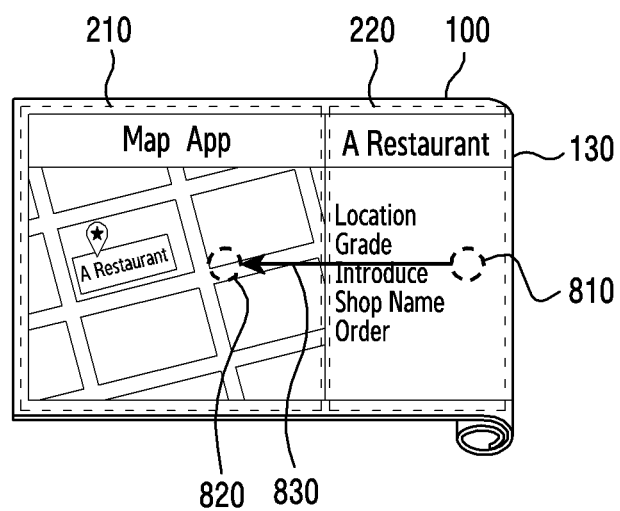
FIG. 8 is a diagram illustrating a type of a user's gesture for reducing a region in which a UI is displayed, performed on a flexible display of an electronic device, according to an embodiment.

FIG. 8 is diagram illustrating a type of a user's gesture for reducing a region in which a UI is displayed, performed on the flexible display 130 of the electronic device 100, according to an embodiment. The electronic device of FIG. 8 may correspond to the electronic device 100 of FIG. 1 and FIG. 2A to FIG. 2C. The electronic device 100 of FIG. 8 may perform at least one of operations of FIG. 3, FIG. 5, and/or FIG. 7.

Referring to FIG. 8, a situation after FIG. 6C is illustrated. In a state displaying a first UI in the first portion 210 of the flexible display 130, in response to identifying of a user input for expanding displaying of the first UI of the user, the electronic device 100 may display a second UI associated with the user input in the second portion 220. In a state respectively displaying the first UI and the second UI in the first portion 210 and the second portion 220, in response to identifying of a user input for stopping displaying of the second UI including a drag gesture starting in the second portion 220 and ending in the first portion 210, the electronic device 100 may stop displaying of the second UI in the second portion 220.

Referring to FIG. 8, a user may perform a drag gesture starting at any one point 810 in the second portion 220 and/or the second UI and ending at any one point 820 of the first portion 210 and/or the first UI along a path 830. The drag gesture may correspond to the drag gesture of operation 720 of FIG. 7. In response to identifying of the drag gesture, the electronic device 100 may stop displaying of the second UI in the second portion 220.

For example, in a state of maintaining the display of the first UI in the first portion 210, the electronic device 100 may stop the display of the second UI in the second portion 220. In response to stopping the display of the second UI, the electronic device 100 may deactivate the second portion 220, or may display another UI based on another application and/or operating system distinct from an application associated with the first portion 210 in the second portion 220. According to the stopping of the display of the second UI, a region in which content is displayed in the flexible display 130 may be reduced.

According to various embodiments, in a state displaying the first UI in the first portion of the flexible display 130, if a user performs a user input for expanding the display of the first UI as shown in FIG. 4A and FIG. 4B, the electronic device 100 may expand and display the first UI in the second portion distinct from the first portion based on the user input, or may display the second UI based at least in part on the first UI. The electronic device 100 may display a third UI based at least in part on the first UI in the second portion, based on another user input performed on the first UI of the first portion and distinct from the user input. The third UI may be associated at least in part with the first UI and/or the second UI.

Figure 9:
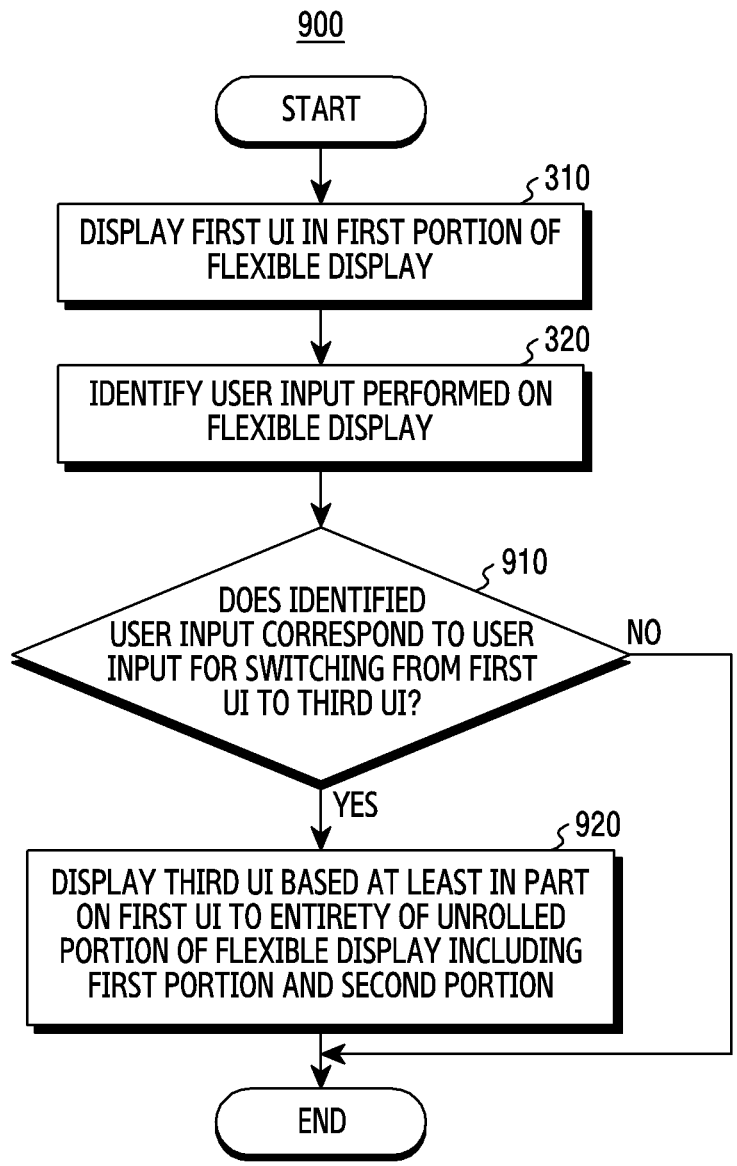
FIG. 9 is a flowchart illustrating another operation of an electronic device, according to an embodiment.

FIG. 9 is a flowchart illustrating another operation of an electronic device, according to an embodiment. The electronic device of FIG. 9 may correspond to the electronic device 100 of FIG. 1 and FIG. 2A to FIG. 2C. A plurality of operations of FIG. 9 may be performed, for example, by the electronic device 100 of FIG. 1 and FIG. 2A to FIG. 2C, and/or the processor 110 of FIG. 1. The plurality of operations of FIG. 9 may be associated with at least one of the operations of FIG. 3 or may be performed similarly thereto.

Referring to a flowchart 900 of FIG. 9, the electronic device performs operations 310 and 320 of FIG. 3. The electronic device may identify a user input performed on a flexible display, in a state displaying a first UI in an unrolled portion (e.g., the first portion 210) of the flexible display. In response to identifying the user input, the electronic device may execute various functions associated with the first UI.

Referring to FIG. 9, in operation 910, the electronic device determines whether the identified user input is a user input for switching from a first UI to a third UI. The user input for switching to the third UI may include a gesture for touching and selecting a visual element in the first UI. If the visual element corresponds to a function for switching to the third UI distinct from the first UI, the electronic device may determine that the identified user input corresponds to the user input for switching from the first UI to the third UI. The third UI may include a window and/or activity associated with the visual element in the first UI selected by the user input.

In response to identifying the user input for switching to the third UI (Yes in operation 910), in operation 920, the electronic device displays the third UI based at least in part on the first UI in the entirety of an unrolled portion of the flexible display including the first portion and the second portion. If the user additionally unrolls the second portion of the flexible display as shown in FIG. 2B to FIG. 2C, in response to identifying the user input, the electronic device may display the third UI in the entirety of the first portion and second portion of the flexible display. Displaying the first UI in the flexible display may be stopped by displaying of the third UI. If the identified user input is not the user input for switching to the third UI (No in operation 910), the electronic device executes a function associated with the user input and/or the first UI in the first portion. Hereinafter, an operation of the electronic device based on FIG. 9 is described in greater detail below with reference to FIGS. 10A and 10B.

Figure 10A:
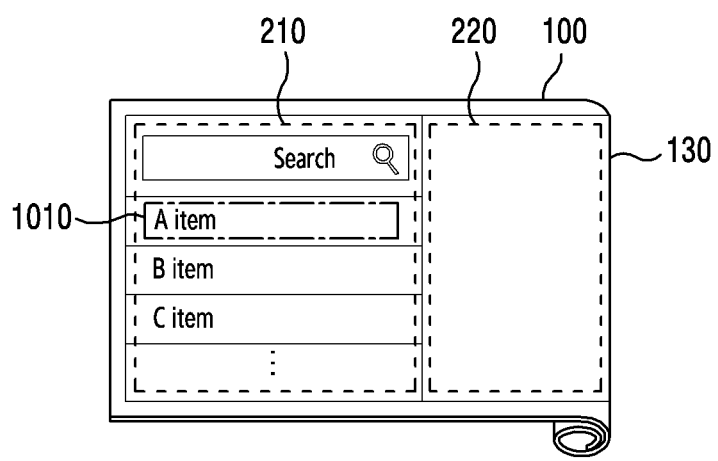
FIG. 10A is a diagram illustrating an operation of switching a UI which is output in a flexible display in response to a user input performed on a flexible display in an electronic device, according to an embodiment.
Figure 10B:
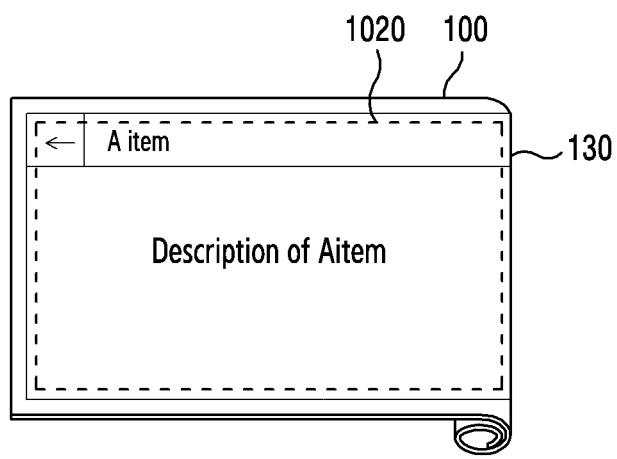
FIG. 10B is a diagram illustrating an operation of switching a UI which is output in a flexible display in response to a user input performed on a flexible display in an electronic device, according to an embodiment.

FIG. 10A and FIG. 10B are diagrams illustrating an operation of switching a UI which is output in the flexible display 130 in response to a user input performed on the flexible display in the electronic device, according to an embodiment. The electronic device 100 of FIG. 10A and FIG. 10B may correspond to the electronic device 100 of FIG. 1 and FIG. 2 to FIG. 2C. The electronic device 100 of FIG. 10A to FIG. 12 may perform at least one of operations of FIG. 3, FIG. 5, FIG. 7, and/or FIG. 9.

Referring to FIG. 10A, a situation after a user performs a gesture and/or action for further unrolling the flexible display 130 is illustrated in a state displaying the first UI in the first portion 210 of the flexible display 130. The electronic device 100 may identify the second portion 220 additionally unrolled by the gesture and/or action. After identifying the second portion 220, the electronic device 100 may perform at least one of the operations of FIG. 5 and/or FIG. 9 in response to different types of user inputs associated with the first UI. For example, if the user performs the user input which is associated with the entirety of the first portion 210 and the second portion 220 and which is for expanding the display of the first UI as shown in FIG. 4A and FIG. 4B, the electronic device 100 may display the first UI and the second UI, respectively, on the first portion 210 and the second portion 220, based on the operation of FIG. 5.

Referring to FIG. 10A, the user may perform a user input of touching a visual element 1010 in the first UI or clicking it based on a mouse coupled with the electronic device 100. In response to identifying the user input of selecting the visual element 1010 in the first UI, the electronic device 100 may display the third UI associated with the user input in the entirety of an unrolled portion of the flexible display 130 including the entirety of the first portion 210 and the second portion 220, based on the operation of FIG. 9. The third UI may include information associated with the visual element 1010.

Referring to FIG. 10B, an example in which the electronic device 100 displays the third UI in the entirety of an unrolled portion 1020 of the flexible display 130 including the entirety of the first portion 210 and the second portion 220 is illustrated, in response to identifying of the user input of selecting the visual element 1010 of FIG. 10A. If the visual element 1010 selected by the user input corresponds to a function (e.g., a function of switching from the first UI to the third UI) for switching the UI, the electronic device 100 may perform switching between the first UI and the third UI, based on the operation of FIG. 9. If the third UI supports a UI change depending on a change of a display region, the electronic device 100 may display the third UI based on a size of the entirety of the unrolled portion 1020 of the flexible display 130. If the third UI does not support the UI change depending on the change of the display region, the electronic device 100 may display the third UI based on a size of the first portion 210 in which the first UI is displayed in the flexible display 130.

According to an embodiment, a UI displayed in the second portion 220 by the electronic device 100 may be based at least in part on a result of executing a function corresponding to a visual element of the first UI of the first portion 210 selected by the user. The function may be associated with a sensor (e.g., a fingerprint recognition sensor) included in the electronic device 100.

Figure 11:
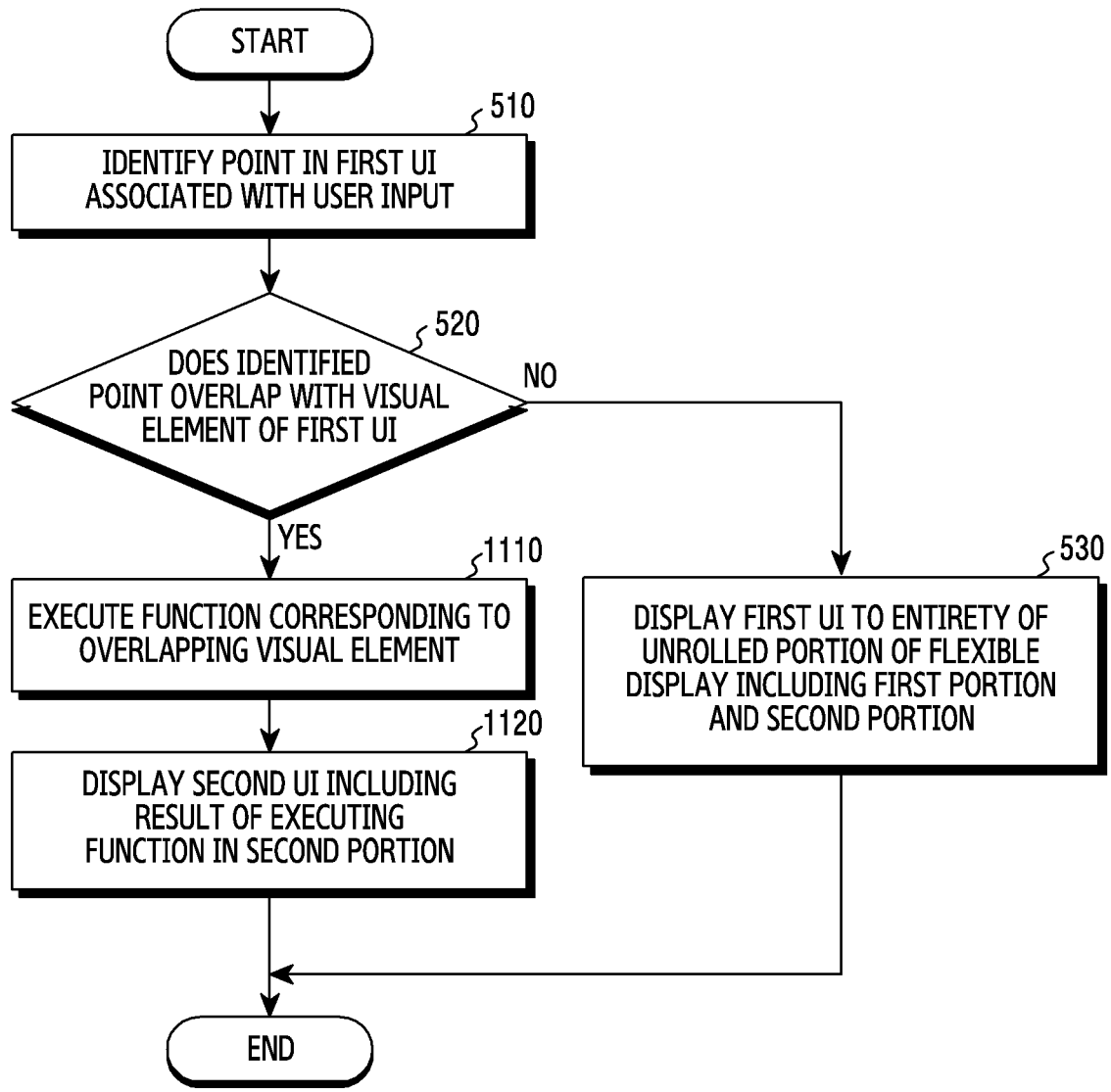
FIG. 11 is a flowchart illustrating an operation of displaying a UI on a flexible display, based on a visual element selected by a user in an electronic device, according to an embodiment.

FIG. 11 is a flowchart illustrating an operation of displaying a UI on a flexible display, based on a visual element selected by a user in an electronic device, according to an embodiment. The electronic device of FIG. 11 may correspond to the electronic device 100 of FIG. 1 and FIG. 2 to FIG. 2C. A plurality of operations of FIG. 11 may be performed, for example, by the electronic device 100 of FIG. 1 and FIG. 2A to FIG. 2C, and/or the processor 110 of FIG. 1. The plurality of operations of FIG. 11 may be associated with operation 340 of FIG. 3 and/or the operations of FIG. 5.

Referring to a flowchart 340-2 of FIG. 11, the electronic device performs operations 510 and 520 of FIG. 5. In response to identifying of the user input for expanding displaying of the first UI as shown in FIG. 4A and FIG. 4B, the electronic device may identify a visual element (e.g., a visual element selected by a touch gesture included in a user input similarly to a visual element overlapping at the point 410) of the first UI associated with the user input. Upon failing to identify the visual element, the first UI may be displayed on the entirety of an unrolled portion of the flexible display including the first portion and the second portion, based on the operation 530.

In response to identifying the visual element of the first UI associated with the user input, in operation 1110, the electronic device executes a function corresponding to the visual element. The function may be associated at least in part with a operation of purchasing a product displayed in the first UI. The function may be a function of acquiring data from a hardware component (e.g., a fingerprint recognition sensor, a camera, and/or a communication circuit) included in the electronic device. The function may be a function of authenticating a user of the electronic device.

In response to executing of the function, in operation 1120, the electronic device displays the second UI including a result of executing the function. The second UI may be displayed in a second portion 220 of the flexible display, distinct from the first portion in which the first UI is displayed. The second UI may include one or more visual elements which display a result of executing the function, for example, a result of purchasing a product displayed in the first UI and/or a result of acquiring data from the hardware component included in the electronic device. Hereinafter, an example of the electronic device for performing the operation of FIG. 11 is described in greater detail with reference to an operation of FIG. 12A and FIG. 12B.

Figure 12A:
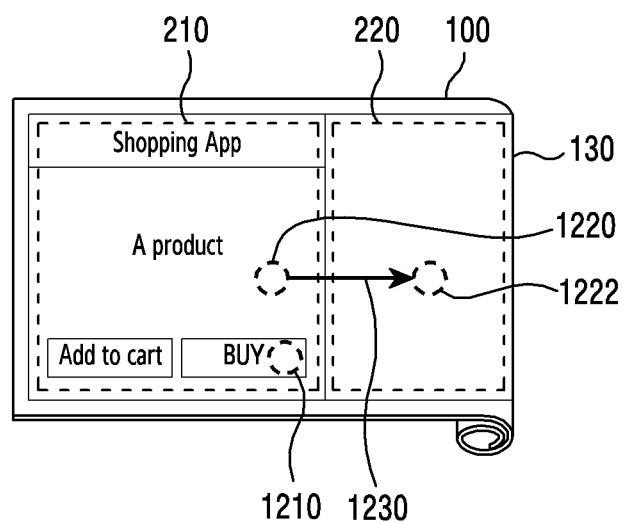
FIG. 12A is a diagram illustrating an operation of performing payment of a product in response to a user input of a user in an electronic device, according to an embodiment.
Figure 12B:
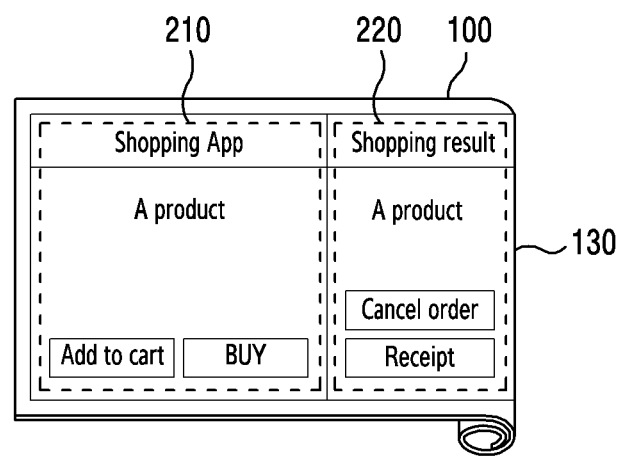
FIG. 12B is a diagram illustrating an operation of performing payment of a product in response to a user input of a user in an electronic device, according to an embodiment.

FIG. 12A and FIG. 12B are diagrams illustrating an operation of performing payment of a product in response to a user input of a user in the electronic device, according to an embodiment. The electronic device 100 of FIG. 12A and FIG. 12B may correspond to the electronic device 100 of FIG. 1 and FIG. 2 to FIG. 2C. The electronic device 100 of FIG. 12A and FIG. 12B may perform at least one of operations of FIG. 3, FIG. 5, FIG. 7, FIG. 9, and/or FIG. 11.

Referring to FIG. 12A, the electronic device 100 displays the first UI in the first portion 210 of the flexible display 130. In a state displaying the first UI in the first portion 210, the user may perform a gesture and/or action for further unrolling the flexible display 130. Referring to FIG. 12A, the second portion 220 of the flexible display 120 may be further unrolled by the user's gesture and/or action. While the second portion 220 is further unrolled, the electronic device 100 may maintain the display of the first UI in the first portion 210.

Referring to FIG. 12A, a user may perform a touch gesture for touching a visual element 1210 in the first UI. The user may perform a drag gesture starting at any one point 1220 in the first UI of the first portion 210 and ending at any one point 1222 in the second portion 220 along a path 1230. The user may simultaneously perform the touch gesture and the drag gesture, or may perform the gestures by at least partially overlapping in a time duration. A user input for expanding the displaying of the first UI may imply a user input for performing the touch gesture and the drag gesture by at least partially overlapping in the time duration.

The visual element 1210 selected by the touch gesture may correspond to a designated function of the electronic device 100 and/or the first UI. For example, the visual element 1210 may correspond to a function of paying a product displayed in the first UI. If the user performs only the touch gesture without the drag gesture, the electronic device 100 may display the second UI for the payment in the first UI in an overlay manner in response to the touch of the visual element 1210. The second UI may include a message which requests a user for additional information required for the payment.

For example, the visual element 1210 may be a visual element for executing a function (e.g., a function of performing the payment according to an authentication result based on the fingerprint) associated with a user's fingerprint. In this case, the second UI may include a message which requests an input of a user's fingerprint via a fingerprint recognition sensor of the electronic device 100. In response to the message, the user may input the fingerprint via the fingerprint recognition sensor viewable to the outside through a housing of the electronic device 100 and/or the fingerprint recognition sensor disposed in the flexible display 130. If the fingerprint recognition sensor is disposed in the flexible display 130, the fingerprint recognition sensor may acquire information associated with the fingerprint from a finger of the user who touches a certain portion on the flexible display 130.

In an embodiment, upon identifying the user input for performing the drag gesture at the same time of the touch gesture while maintaining the touch gesture, the electronic device 100 may acquire a user's fingerprint through a touch gesture which is maintained together with the drag gesture while displaying the second UI based on the user input on the second portion 220, as shown in FIG. 12B. For example, if a fingerprint recognition sensor is disposed on the flexible display 130, the electronic device 100 may acquire information (e.g., data associated with the user's fingerprint) associated with the second UI while displaying the second UI based on the user input. The information may be acquired from a fingerprint of a user who touches the visual element 1210. In this case, a result of acquiring the user's fingerprint by using the fingerprint recognition sensor (e.g., a result of authentication the user based on the fingerprint and/or a result of performing payment based on authentication) may be displayed in the second UI displayed in the second portion 220.

As described above, since information associated with the second UI to be displayed by the user input is acquired while the electronic device 100 receives or identifies a user input for expanding displaying of the first UI, the user may acquire the same result by performing fewer operations. For example, the user may acquire a result to be obtained more quickly through the second UI, without performing an additional operation (an additional operation for inputting a fingerprint) for the second UI.

Figure 13A:
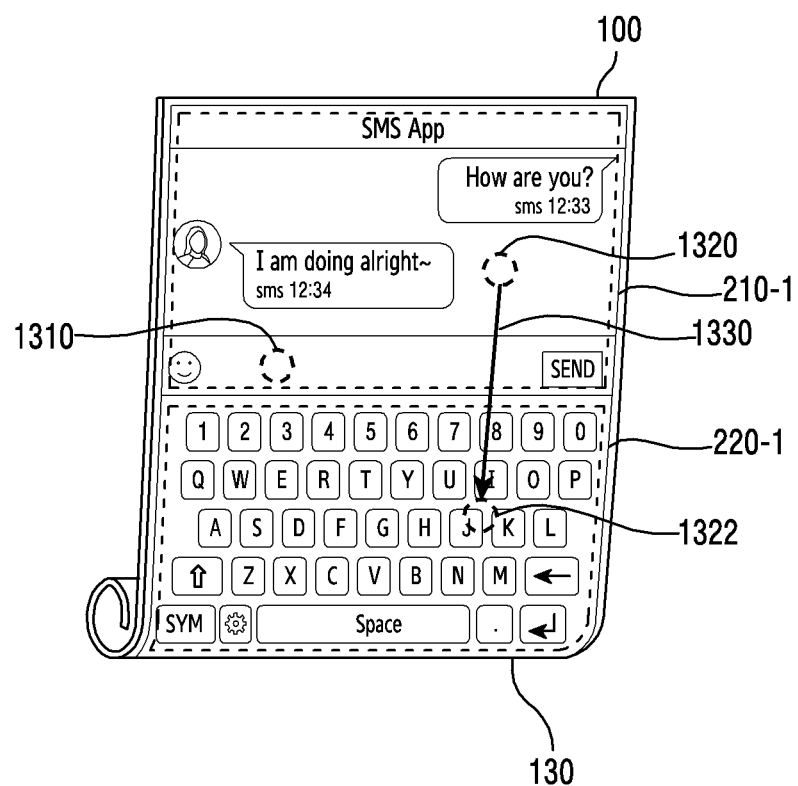
FIG. 13A illustrates examples of a UI which is output on a flexible display in an electronic device, according to an embodiment.
Figure 13B:
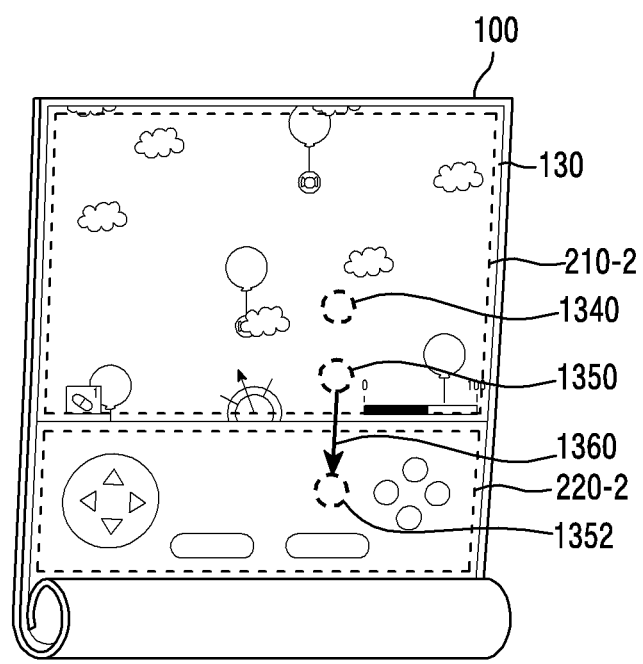
FIG. 13B illustrates examples of a UI which is output on a flexible display in an electronic device, according to an embodiment.

FIG. 13A and FIG. 13B are diagrams illustrating a UI which is output on the flexible display in the electronic device, according to an embodiment. The electronic device of FIG. 13A and FIG. 13B may correspond to the electronic device 100 of FIG. 1 and FIG. 2 to FIG. 2C. The electronic device 100 of FIG. 13A and FIG. 13B may perform at least one of operations of FIG. 3, FIG. 5, FIG. 7, FIG. 9, and/or FIG. 11.

Referring to FIG. 13A and FIG. 13B, the flexible display 130 of the electronic device 100 may be rolled in various directions about a designated rolling axis. Referring to FIG. 13A, a user may roll the flexible display 130 so that at least part of a rolled portion of the flexible display 130 is viewable to the outside. Referring to FIG. 13B, the user may roll the flexible display 130 so that the rolled portion of the flexible display 130 is not viewable to the outside. Even if the user rolls the flexible display 130 in any direction in FIG. 13A and FIG. 13B, the electronic device 100 may identify the unrolled portion and another rolled portion in the flexible display 130. The electronic device 100 may identify a direction in which the user rolls the flexible display 130 based on a bending sensor (e.g., the bending sensors 142-1 to 142-10 of FIG. 2A).

Referring to FIG. 13A and FIG. 13B, a user performs an interaction with the electronic device 100, based on a first portion 210-1 of the flexible display 130 in a state of disposing a rolling axis of the flexible display 130 horizontally on the ground. Referring to FIG. 13A, the user may control the electronic device 100 based on a messenger application installed in the electronic device 100. In a state displaying the first UI based on the messenger application in the first portion 210-1, the user may perform a gesture for further unrolling the flexible display 130. The electronic device 100 may identify the second portion 220-1 additionally unrolled in the flexible display 130 by the gesture. In an embodiment, the electronic device 100 may activate part of a touch sensor and/or pixel of the flexible display 130 corresponding to the second portion 220-1.

After further unrolling the flexible display 130, the user may perform a user input for expanding the first UI displayed on the first portion 210-1 in the second portion 220-1. Referring to FIG. 13A, the user may perform a user input including a touch gesture for touching a point 1301 of the first UI of the first portion 210-1 and a drag gesture at least partially overlapping in a time domain with the touch gesture, starting at a point 1320 in the first portion 210-1, and ending at a point 1322 in the second portion 220-1 along a path 1330. In response to identifying of the user input, the electronic device 100 may identify the second UI corresponding to the user input, for example, based on the operations of FIG. 5.

The second UI may include at least one visual element for inputting data to the first UI displayed in the first portion 210-1. Referring to FIG. 13A, the second UI may include a plurality of visual elements based on a keypad arranged in a QWERTY or designated manner. The second UI may be displayed based on a visual element (e.g., a visual element such as a text field for inputting a text) in the first UI selected by the user input. For example, if the user touches a visual element in which a specific character is displayed in the second UI, the electronic device 100 may display a text based on the specific character on the visual element in the first UI selected by the user input.

Referring to FIG. 13B, the user may control the electronic device 100 based on a game application installed in the electronic device 100. In a state displaying the first UI based on the game application in a first portion 210-2, the user may further unroll the flexible display 130. As in FIG. 13A, the electronic device 100 may identify a second portion 220-2 additionally unrolled in the flexible display 130 by the user.

Referring to FIG. 13B, the user may perform a user input for expanding the first UI displayed on the first portion 210-2 in the second portion 220-2. Referring to FIG. 13B, the user may perform a user input including a touch gesture for touching a point 1340 in the first portion 210-2 and a drag gesture at least partially overlapping in a time domain with the touch gesture, starting at a point 1350 in the first portion 210-2, and ending at a point 1352 in the second portion 220-2 along a path 1360. In response to identifying of the user input, the electronic device 100 may identify the second UI based at least in part on a size of the second portion 220-2 from the game application associated with the first UI.

The second UI may include at least one visual element for inputting data to the first UI displayed in the first portion 210-1. Referring to FIG. 13B, the second UI may include a plurality of visual elements based on a game pad associated with the game application. When the user performs a gesture associated with a visual element in the second UI, the electronic device 100 may change the display of the visual element displayed in the first UI in response to identifying of the gesture.

According to an embodiment, in a state where the electronic device 100 operates, the user may frequently roll and/or unroll the flexible display 130 of the electronic device 100. The electronic device 100 may change the display of a plurality of UIs displayed in an unrolled portion, in response to a change in the size of the unrolled portion of the flexible display 130.

Figure 14:
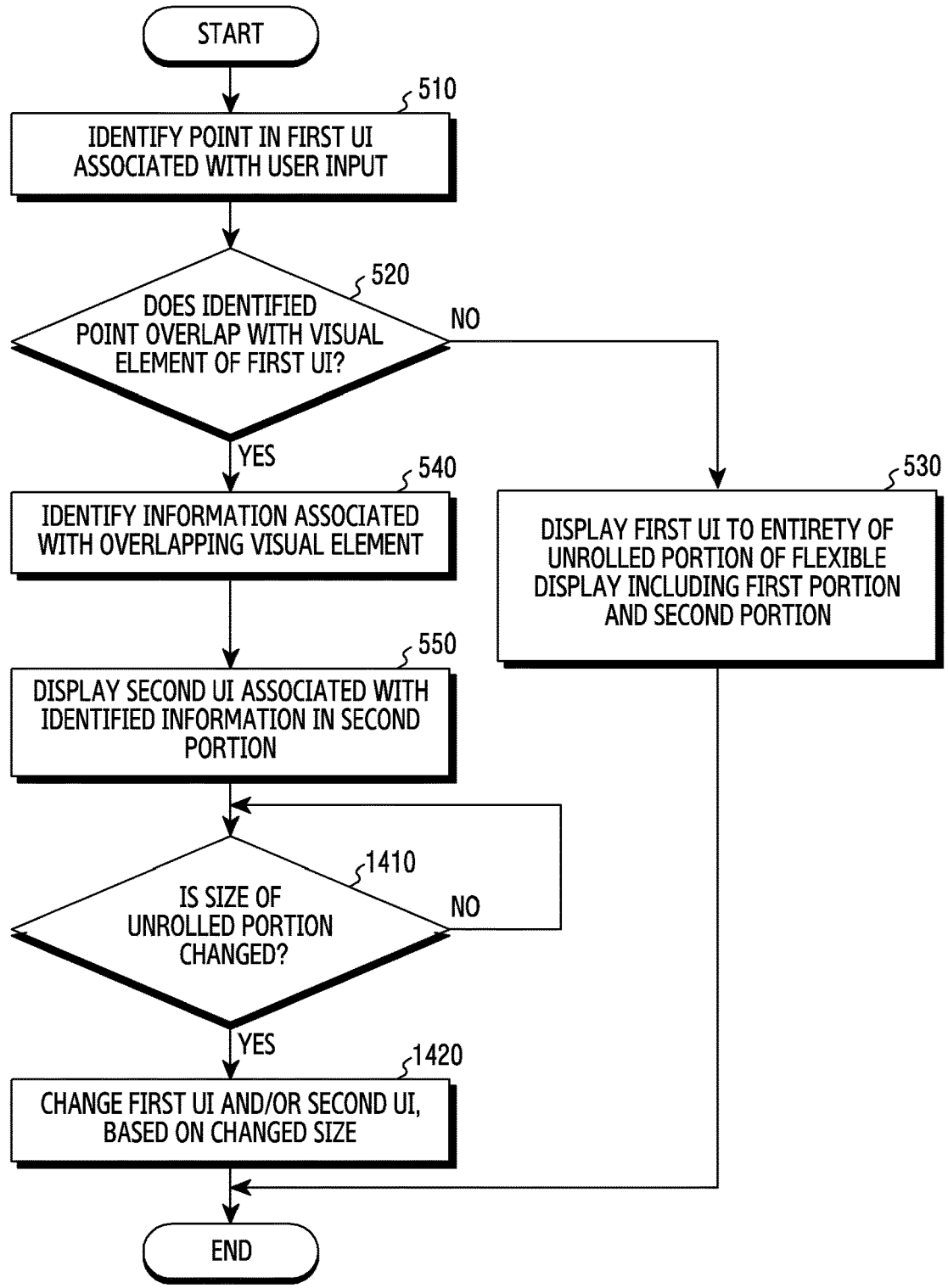
FIG. 14 is a flowchart illustrating an operation of changing a UI in response to a user's action of adjusting a size of an unrolled portion of a flexible display in an electronic device, according to an embodiment.

FIG. 14 is a flowchart illustrating an operation of changing a UI in response to a user's action of adjusting a size of an unrolled portion of a flexible display in an electronic device, according to an embodiment. The electronic device of FIG. 14 may correspond to the electronic device 100 of FIG. 1 and FIG. 2 to FIG. 2C. A plurality of operations of FIG. 14 may be performed, for example, by the electronic device 100 of FIG. 1 and FIG. 2A to FIG. 2C, and/or the processor 110 of FIG. 1. The plurality of operations of FIG. 14 may be associated with operation 340 of FIG. 3 and/or the operations of FIG. 5.

Referring to a flowchart 340-3 of FIG. 14, the electronic device performs operations 510, 520, 530, 540, and 550 of FIG. 5. In a state displaying a first UI on an unrolled first portion of a flexible display, a user may perform a user input for expanding the display of the first UI. The user input may correspond to the user input of FIG. 4A and FIG. 4B. In response to identifying the user input, in operation 510, the electronic device identifies a point (e.g., a point in the first UI selected by a touch gesture included in the user input) in the first UI associated with the user input. In response to identifying of the point in the first UI, in operation 520, the electronic device determines whether the identified point overlaps with a visual element of the first UI. If the point does not overlap with the visual element of the first UI (No in operation 520), in operation 530, the electronic device displays the first UI in the entirety of an unrolled portion of the flexible display including the first portion and the second portion. In an embodiment, operation 530 may be similar to an operation corresponding to a pinch-to-zoom gesture performed in the first UI.

If the point overlaps with the visual element of the first UI (Yes in operation 520), in operation 540, the electronic device identifies information associated with the overlapping visual element. In response to identifying of the information, in operation 550, the electronic device displays the second UI associated with the identified information in the second portion distinct from the first portion. A level of the information displayed in the second UI may be associated with a size of the second portion.

In a state displaying the second UI in the second portion, in operation 1410, the electronic device determines whether a size of the unrolled portion of the flexible display is changed by the user. For example, while the first UI and the second UI are displayed respectively on the first portion and the second portion, the user may additionally unroll or roll the flexible display. The electronic device according to an embodiment may change the display of the first UI and the second UI on a real-time basis based on a user's action of unrolling or rolling the flexible display.

Referring to FIG. 14, if a size of the unrolled portion of the flexible display is changed by the user, in operation 1420, the electronic device changes the first UI and/or the second UI based on the size of the unrolled portion of the flexible display, changed by the user. For example, if only the size of the second portion is changed by the user, the electronic device may change the display of the second UI based on the changed size of the second portion. For example, if the user rolls the flexible display about a rolling axis so that the size of the unrolled portion of the flexible display is less than the size of the first portion in which the first UI is displayed, the electronic device may end the display of the second UI in the second portion, and may display only the first UI in the unrolled portion having a size less than the size of the first portion. If the size of the unrolled portion of the flexible display is less than a size of the entirety of the first portion in which the first UI is displayed and the second portion in which the second UI is displayed, the electronic device may display the first UI and the second UI by reducing the total size thereof with the same ratio in the unrolled portion of the flexible display.

FIG. 15A to FIG. 15D are diagrams illustrating different types of UIs displayed based on a size of an unrolled portion of the flexible display in the electronic device, according to an embodiment. The electronic device 100 of FIG. 15A to FIG. 15D may correspond to the electronic device 100 of FIG. 1 and FIG. 2 to FIG. 2C. The electronic device 100 of FIG. 15A to FIG. 15D may perform at least one of operations of FIG. 3, FIG. 5, FIG. 7, FIG. 9, FIG. 11, and/or FIG. 14.

Figure 15A:
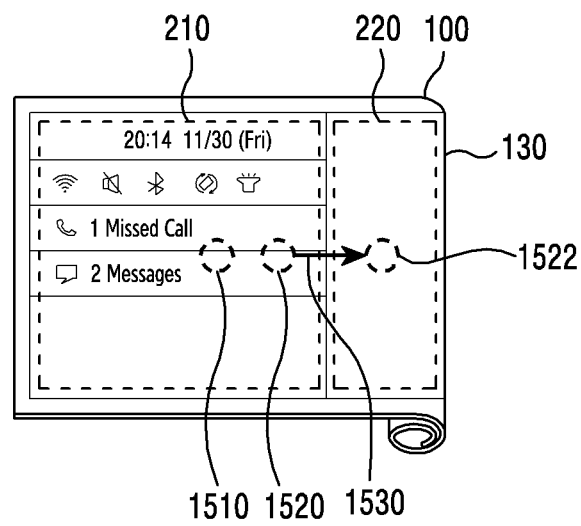
FIG. 15A is a diagram illustrating different types of UIs displayed based on a size of an unrolled portion of a flexible display in an electronic device, according to an embodiment.

Referring to FIG. 15A, the electronic device 100 may display a first UI in the first portion 210 of the flexible display 130. In a state displaying the first UI in the first portion 210, a user may further unroll the flexible display 130. While the user further unrolls the flexible display 130, the electronic device 100 may maintain the display of the first UI on the first portion 210. For example, the first UI may be a UI based on an operating system of the electronic device 100 including a plurality of notification messages (e.g., a notification message for notifying a missed call and/or a new message) identified from a plurality of applications installed in the electronic device such as a notification center. The electronic device 100 may identify the second portion 220 additionally unrolled in the flexible display 130 by the user.

Referring to FIG. 15A, the user may perform a user input for displaying a second UI based on the first UI of the first portion 210 in the second portion 220. For example, the user may perform a user input including a touch gesture for touching a point 1510 in the first UI and a drag gesture starting at a point 1520, distinct from the point 1510, in the first UI and ending at a point 1522 along a path 1530.

In response to the identifying of the user input, the electronic device 100 may display the second UI based at least in part on the first UI in the second portion 220. In a state displaying the first UI in the first portion 210, the electronic device 100 may display the second UI in the second portion 220. If the first UI includes a plurality of notification messages, the second UI may include one or more visual elements associated with the plurality of notification messages. A type and/or size of the one or more visual elements displayed on the second UI may be determined based on a size of the second portion 220 in which the second UI is to be displayed.

Figure 15B:
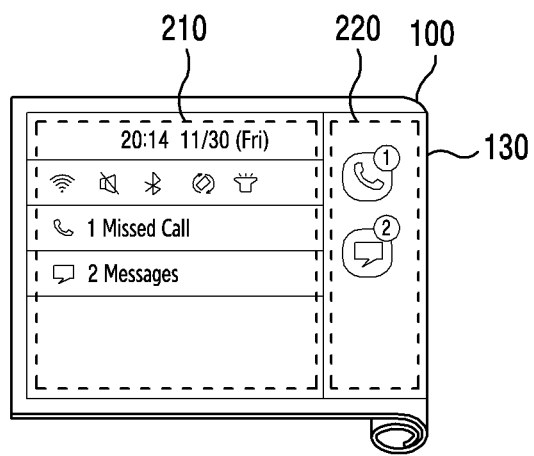
FIG. 15B is a diagram illustrating different types of UIs displayed based on a size of an unrolled portion of a flexible display in an electronic device, according to an embodiment.

Referring to FIG. 15B, in response to identifying that the second portion 220 is smaller than a designated first size, the electronic device 100 may display the second UI including a plurality of visual elements respectively corresponding to the plurality of notification messages (e.g., icons of a plurality of applications respectively corresponding to the plurality of notification messages). According to an embodiment, the electronic device 100 may further display a plurality of indicators displayed in an overlapping manner on the plurality of visual elements. For example, the indicator may indicate the number of missed calls and/or the number of new messages. Each of the plurality of notification messages may be displayed in an icon shape in the second UI of the second portion 220 that is smaller than the designated first size.

Figure 15C:
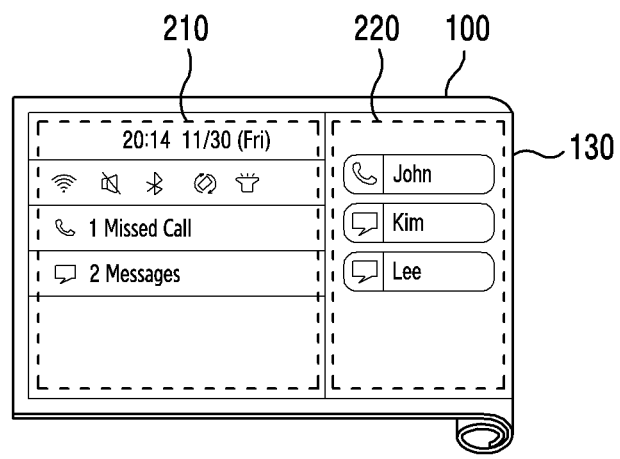
FIG. 15C is a diagram illustrating different types of UIs displayed based on a size of an unrolled portion of a flexible display in an electronic device, according to an embodiment.

Referring to FIG. 15C, in response to identifying that the second portion 220 is greater than the designated first size, the electronic device 100 may further display information corresponding to each of the plurality of notification messages, together with the plurality of visual elements displayed in the second UI in case of being less than the designated first size. For example, the electronic device 100 may further display at least part (e.g., a family name of a person who sends a missed call) of a text identified from the plurality of notification messages, together with a plurality of icons respectively corresponding to the plurality of notification messages. Each of the plurality of notification messages may be displayed in a form of a widget, in the second UI of the second portion greater than or equal to the designated first size.

Figure 15D:
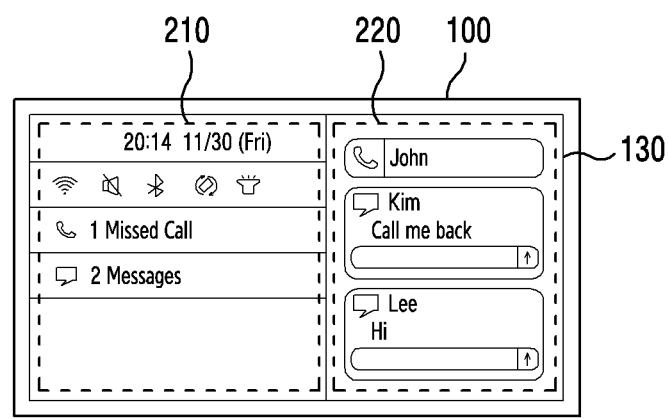
FIG. 15D is a diagram illustrating different types of UIs displayed based on a size of an unrolled portion of a flexible display in an electronic device, according to an embodiment.

Referring to FIG. 15D, in response to identifying that the second portion 220 is greater than or equal to a designated second size exceeding a first size, the electronic device 100 may further display a plurality of visual elements for interactions respectively associated with a plurality of notification messages, together with a plurality of visual elements displayed in the second UI of the second portion 220 greater than or equal to the first size and less than the second size. For example, the electronic device 100 may further display a visual element for executing a function associated with the plurality of notification messages, together with an icon and text corresponding to each of the plurality of notification messages. Referring to FIG. 15D, in response to the notification message associated with a new message, a visual element (e.g., a text input field) for transmitting a response may be further displayed in the second UI.

As described above, information that can be included in the second UI displayed in the second portion 220 may vary depending on a size of the flexible display 130 unrolled by a first user input. For example, information that can be included in the second UI displayed in the second portion 220 may be increased along with the increase in the size of the second portion 220.

Figure 16A:
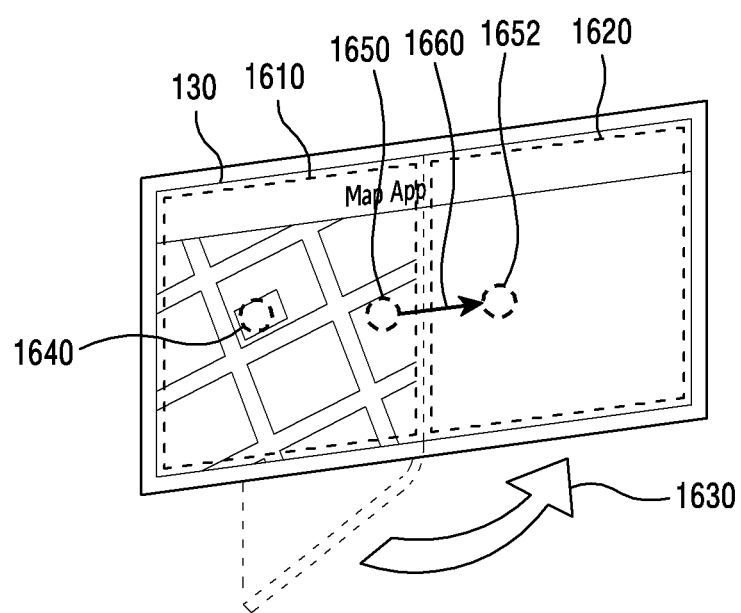
FIG. 16A is a diagram illustrating an operation of outputting a UI on a plurality of portions of a flexible display, distinct by a bending action of a user, in an electronic device according to an embodiment.
Figure 16B:
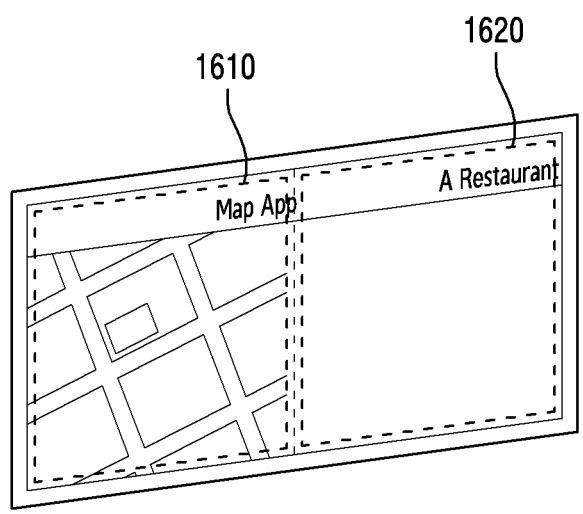
FIG. 16B is a diagram illustrating an operation of outputting a UI on a plurality of portions of a flexible display, distinct by a bending action of a user, in an electronic device, according to an embodiment.

FIG. 16A and FIG. 16B are diagrams illustrating an operation of outputting a UI on a plurality of portions of a flexible display, distinct by a bending action of a user, in the electronic device, according to an embodiment. The electronic device 100 of FIG. 16A and FIG. 16B may correspond to the electronic device 100 of FIG. 1 and FIG. 2 to FIG. 2C. The electronic device 100 of FIG. 16A and FIG. 16B may perform at least one of operations of FIG. 3, FIG. 5, FIG. 7, FIG. 9, and/or FIG. 11.

According to an embodiment, the electronic device 100 may be a foldable electronic device including at least two housings coupled by using a rotatable hinge. Referring to FIG. 16A, in a state where the flexible display 130 of the electronic device 100 is bent based on the hinge, at least part of the flexible display 130 may be viewable to the outside. In a state where the flexible display 130 is bent, the electronic device 100 may display the first UI in a first portion 1610, between the unrolled first portion 1610 and a second portion 1620 of the flexible display 130, distinct by a bending portion of the flexible display 130. The first UI may be displayed in a portion viewed by the user between the first portion 1610 and the second portion 1620. The portion viewed by the user may be identified based on an image sensor included in the electronic device 100.

Referring to FIG. 16A, in a state displaying the first UI in the first portion 1610, a user may unroll the flexible display 130. In this case, the second portion 1620 may move towards the user. The electronic device 100 may identify a user input which unrolls the flexible display 130 based on at least one bending sensor (e.g., the bending sensors 142-1 to 142-10).

Referring to FIG. 16A, after unrolling the flexible display 130, the user may perform a touch gesture for touching a point 1640 in the first portion 1610 in which the first UI is displayed and a drag gesture starting at a point 1650 in the first portion 1610 and ending at a point 1652 in the second portion 1620 along a path 1660, in such a manner that the gestures overlap at least partially in a time domain.

Referring to FIG. 16B, in response to identifying the touch gesture and the drag gesture, the electronic device 100 may display the second UI based at least in part on the point 1640 of the touch gesture, in the second portion 1620. While displaying the first UI in the first portion 1610, the electronic device 100 may display the second UI in the second portion 1620. If the first UI includes a map screen based on a map application installed in the electronic device 100, the second UI may include information associated with a building and/or place overlapping with the point 1640 in the map screen.

According to an embodiment, an electronic device includes a flexible display that is rollable about a rolling axis, and a flexible display that is foldable about a designated bending axis. When the user rolls the flexible display about the rolling axis, the electronic device may identify a change in a size of an unrolled portion of the flexible display based on a user's action. If the unrolled portion of the flexible display increases in size, the electronic device may identify the first portion unrolled before the user unrolls the flexible display, and the second portion additionally unrolled when the user unrolls the flexible display. The electronic device may maintain the display of the first UI in the first portion before or after the user unrolls the flexible display.

The electronic device may identify a user input for displaying the second UI in the second portion distinct from the first portion based on the first UI displayed in the first portion of the flexible display. The user input may include a drag gesture starting in the first UI of the first portion and ending in the second portion. The user input may include a touch gesture for selecting at least one visual element in the first UI. The second UI may be acquired based at least in part on a size of the second portion and/or the visual element selected by the touch gesture.

According to an embodiment, an electronic device includes a flexible display, at least one sensor, a memory, and a processor operatively coupled with the flexible display, the at least one sensor, and the memory. The memory may include a plurality of instructions. The plurality of instructions may allow the processor to display a UI having a size of the first portion of the flexible display, within the first portion, identify a user input associated with a first point and a second point, both in the first portion, while displaying the first UI within the first portion, where the first point is different form the second point, and display a second UI, based at least in part on the first UI, within the second portion of the flexible display, in response to identifying the user input, wherein the second portion is distinct from the first portion.

The plurality of instructions may allow the processor to display the first UI based on a first axis in the flexible display, and maintain the display of the first UI including the first axis and having a size of the first portion, when the flexible display is unrolled by a user of the electronic device. The first axis may be opposite to the second axis around which another portion of the flexible display is wound, where the other portion is distinct from the first portion.

The plurality of instructions may allow the processor to identify the user input, which includes a touch gesture at the first point and a drag gesture starting at the second point and ending at a third point distinct from the first point and the second point, while maintaining the touch gesture at the first point, and identify the second UI having a size of the second portion, in response to identifying that the third point is within the second portion or is included in a designated portion including a boundary between the first portion and the second portion.

The plurality of instructions may allow the processor to identify a visual element displayed in the first point, in the first UI displayed in the first portion, in response to identifying of the third point, and display the second UI including information associated with the visual element in the second portion, based at least in part on an application associated with the first UI, in response to identifying of the visual element.

The plurality of instructions may allow the processor to display first data associated with the visual element in the second UI, in response to identifying that the second portion is smaller than a designated size, and display the first data in the second UI and second data associated with the visual element, in response to identifying that the second portion is greater than or equal to the designated size. The displaying of the second data is prohibited when the second portion is smaller than the designated size.

The plurality of instructions may allow the processor to display the first UI adjusted by the user input to an entirety of the first portion and the second portion, in response to identifying that the visual element displayed at the first point corresponds to a background of the first UI.

The flexible display may include a second sensor disposed in the flexible display and that acquires information associated with a fingerprint of a finger that touches the flexible display. The plurality of instructions may allow the processor to acquire information associated with the fingerprint by using the second sensor, in response to identifying that the user input includes a touch gesture for touching the first point at least partially overlapping with a visual element, while displaying the first UI including the visual element for executing a function associated with the fingerprint, and display the second UI in the second portion based at least in part on information associated with the fingerprint, in response to acquiring the information associated with the fingerprint.

The plurality of instructions may allow the processor to display a third UI associated with a second user input to an entirety of the first portion and the second portion, in response to identifying the second user input for selecting a visual element in the first UI.

The plurality of instructions may allow the processor to identify the user input, which includes a touch gesture for touching the first point for at least a designated time and a drag gesture starting at the first point and ending at the second point, and display the second UI having a size of the second portion, in response to identifying that a third point of the user input included in a designated portion includes a boundary between the first portion and the second portion.

The plurality of instructions may allow the processor to stop displaying the second UI in the second portion, while displaying the first UI and the second UI in the first portion and the second portion, respectively, in response to identifying of a third user input including a drag gesture starting in the second portion and ending in the first portion.

According to an embodiment, a method of an electronic device includes displaying a UI having a size of the first portion of a flexible display of the electronic device, within the first portion, identifying a user input associated with a first point and a second point, both in the first portion, while displaying the first UI within the first portion, and displaying a second UI based at least in part on the first UI within the second portion of the flexible display, distinct from the first portion, in response to identifying the user input.

Displaying the first UI may include displaying the first UI based on a first axis in the flexible display. The displaying of the first UI may be maintained in the first portion including the first axis, when the flexible display is unrolled by a user of the electronic device. The first axis may be opposite to a second axis around which another portion of the flexible display is wound.

The method of the electronic device may further include identifying the user input, which includes a touch gesture at the first point and a drag gesture starting at the second point and ending at a third point distinct from the first point and the second point, while maintaining the touch gesture at the first point, and identifying the second UI having a size of the second portion, in response to identifying that the third point is within the second portion or is included in a designated portion including a boundary between the first portion and the second portion.

Identifying the second UI may include identifying a visual element displayed in the first point, in the first UI displayed in the first portion, in response to identifying the third point. The displaying of the second UI may include displaying the second UI including information associated with the visual element in the second portion, based at least in part on an application associated with the first UI, in response to identifying the visual element.

Displaying the second UI may include displaying first data associated with the visual element in the second UI, in response to identifying that the second portion is smaller than a designated size, and displaying the first data in the second UI and second data associated with the visual element, in response to identifying that the second portion is greater than or equal to the designated size. The displaying of the second data may is prohibited when the second portion is smaller than the designated size.

The method of the electronic device may further include displaying the first UI adjusted by the user input to an entirety of the first portion and the second portion, in response to identifying that the visual element displayed at the first point corresponds to a background of the first UI.

Identifying the user input may include acquiring information associated with the fingerprint from a finger which touches the first point, in response to identifying that the first point at least partially overlapping with a visual element, while displaying the first UI including the visual element for executing a function associated with the fingerprint. The displaying of the second UI in the second portion may include displaying the second UI based at least in part on information associated with the fingerprint, in response to acquiring the information associated with the fingerprint.

The method of the electronic device may further include, after identifying the second portion, displaying a third UI associated with a second user input to an entirety of the first portion and the second portion, in response to identifying the second user input for selecting a visual element in the first UI.

The method of the electronic device may further include identifying the user input, which includes a touch gesture for touching the first point for at least a designated time and a drag gesture starting at the first point and ending at the second point. The displaying of the second UI may include displaying the second UI having a size of the second portion, in response to identifying a third point of the user input included in a designated portion including a boundary between the first portion and the second portion.

The method of the electronic device may further include stopping displaying the second UI in the second portion, while displaying the first UI and the second UI in the first portion and the second portion, respectively, in response to identifying a third user input including a drag gesture starting in the second portion and ending in the first portion.

Methods based on the embodiments of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have access to a device for performing an embodiment of the disclosure via an external port. In addition, an additional storage device on a communication network can have access to the device for performing the embodiment of the disclosure.

In the aforementioned embodiments, a component included in the disclosure is expressed in a singular or plural form according to the specific embodiment proposed herein. However, the singular or plural expression is selected properly for a situation proposed for the convenience of explanation, and thus the various embodiments are not limited to a single or a plurality of components. Therefore, a component expressed in a plural form can also be expressed in a singular form, or vice versa.

While the disclosure has been shown and described with reference to certain embodiments thereof, it will be understood by those skilled in the art that various changes in form and detail may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

What is claimed is:

1. An electronic device comprising:
 a rollable display;
 at least one sensor;
 a memory; and
 a processor operatively coupled with the rollable display, the at least one sensor, and the memory, wherein the memory includes a plurality of instructions, and the plurality of instructions allow the processor to:
  display a first user interface (UI) within a first portion of the rollable display;
  obtain, vie the at least one sensor, an input for unrolling the rollable display,
  in response to the input, unroll the rollable display, wherein an unrolled area of the rollable display, formed by the input for unrolling the rollable display, corresponds to a second portion of the rollable display and the unrolled area is expanded from the first portion,
  identify a user input including a first input and a second input while displaying the first UI within the first portion, wherein the first input is located on a first point in the first portion and the second input is moved from a second point to a third point in the second portion while the first input remains at the first point; and
  in response to determining that the first point overlaps a visual element displayed in the first UI, display a second UI, based on information on the visual element displayed in the first UI, within the second portion of the rollable display,
  in response to determining that the first point does not overlap the visual element displayed in the first UI, display the first UI in an area including the first portion and the second portion of the rollable display.

2. The electronic device of claim 1, wherein the plurality of instructions further allow the processor to:
  display the first UI based on a first axis in the rollable display, wherein the first axis is opposite to a second axis around which a third portion of the rollable display is wound, wherein the third portion is distinct from the first portion; and
  maintain the display of the first UI including the first axis and having a size of the first portion, while the rollable display is unrolled by a user of the electronic device.

3. The electronic device of claim 1, wherein the plurality of instructions further allow the processor to:
  identify the user input, which includes a touch gesture at the first point and a drag gesture starting at the second point and ending at a third point distinct from the first point and the second point, while maintaining the touch gesture at the first point; and
  identify the second UI having a size of the second portion, in response to identifying that the third point is within the second portion or is included in a designated portion including a boundary between the first portion and the second portion.

4. The electronic device of claim 3, wherein the plurality of instructions further allow the processor to:
  identify a visual element displayed in the first point in the first UI displayed in the first portion, in response to identifying the third point; and
  display the second UI including information associated with the visual element in the second portion, based at least in part on an application associated with the first UI, in response to identifying the visual element.

5. The electronic device of claim 4, wherein the plurality of instructions further allow the processor to:
  display first data associated with the visual element in the second UI, in response to identifying that the second portion is smaller than a designated size; and
  display the first data in the second UI and second data associated with the visual element, in response to identifying that the second portion is greater than or equal to the designated size, wherein displaying the second data is prohibited when the second portion is smaller than the designated size.

6. The electronic device of claim 4, wherein the plurality of instructions further allow the processor to display the first UI adjusted by the user input to an entirety of the first portion and the second portion, in response to identifying that the visual element displayed at the first point corresponds to a background of the first UI.

7. The electronic device of claim 3,
  wherein the rollable display includes a second sensor disposed in the rollable display and that acquires information associated with a fingerprint of a finger that touches the rollable display, and
  wherein the plurality of instructions further allow the processor to:
    acquire information associated with the fingerprint by using the second sensor, in response to identifying that the user input includes a touch gesture for touching the first point at least partially overlapping with a visual element, while displaying the first UI including the visual element for executing a function associated with the fingerprint; and
    display the second UI in the second portion based at least in part on information associated with the fingerprint, in response to acquiring the information associated with the fingerprint.

8. The electronic device of claim 3, wherein the plurality of instructions further allow the processor to display a third UI associated with a second user input to an entirety of the first portion and the second portion, in response to identifying the second user input for selecting a visual element in the first UI.

9. The electronic device of claim 1, wherein the plurality of instructions further allow the processor to:
  identify the user input, which includes a touch gesture for touching the first point for at least a designated time and a drag gesture starting at the first point and ending at the second point; and
  display the second UI having a size of the second portion, in response to identifying a third point of the user input included in a designated portion including a boundary between the first portion and the second portion.

10. The electronic device of claim 1, wherein the plurality of instructions further allow the processor to stop displaying the second UI in the second portion, while displaying the first UI and the second UI in the first portion and the second portion, respectively, in response to identifying a third user input including a drag gesture starting in the second portion and ending in the first portion.

11. A method of an electronic device, the method comprising:
  displaying, on a rollable display, a first user interface (UI) within a first portion of the rollable display;
  obtaining, vie at least one sensor, an input for unrolling the rollable display,
  in response to the input, unrolling the rollable display, wherein an unrolled area of the rollable display, formed by the input for unrolling the rollable display, corresponds to a second portion of the rollable display and the unrolled area is expanded from the first portion;
  identifying a user input including a first input and a second input while displaying the first UI within the first portion, wherein the first input is located on a first point in the first portion and the second input is moved from a second point to a third point in the second portion while the first input remains at the first point; and in response to determining that the first point overlaps a visual element displayed in the first UI, displaying a second UI based on information on the visual element displayed in the first UI, within the second portion of the rollable display, in response to determining that the first point does not overlap the visual element displayed in the first UI, display the first UI in an area including the first portion and the second portion of the rollable display.

12. The method of claim 11, wherein displaying the first UI includes displaying the first UI based on a first axis in the rollable display, wherein the first axis is opposite to a second axis around which a third portion of the rollable display is wound, wherein the third portion is distinct from the first portion; and wherein displaying the first UI is maintained in the first portion including the first axis, while the rollable display is unrolled by a user of the electronic device.

13. The method of claim 11, further comprising:

identifying the user input, which includes a touch gesture at the first point and a drag gesture starting at the second point and ending at a third point distinct from the first point and the second point, while maintaining the touch gesture at the first point; and identifying the second UI having a size of the second portion, in response to identifying that the third point is within the second portion or is included in a designated portion including a boundary between the first portion and the second portion.

14. The method of claim 13, wherein identifying the second UI includes identifying a visual element displayed in the first point, in the first UI displayed in the first portion, in response to identifying the third point, and wherein displaying the second UI includes displaying the second UI including information associated with the visual element in the second portion, based at least in part on an application associated with the first UI, in response to identifying the visual element.

15. The method of claim 14, wherein displaying the second UI includes:

displaying first data associated with the visual element in the second UI, in response to identifying that the second portion is smaller than a designated size; and displaying the first data in the second UI and second data associated with the visual element, in response to identifying that the second portion is greater than or equal to the designated size, wherein displaying the second data is prohibited when the second portion is smaller than the designated size.

16. The method of claim 14, further comprising displaying the first UI adjusted by the user input to an entirety of the first portion and the second portion, in response to identifying that the visual element displayed at the first point corresponds to a background of the first UI.

17. The method of claim 13, wherein identifying the user input includes acquiring information associated with a fingerprint from a finger that touches the first point, in response to identifying the first point at least partially overlapping with a visual element, while displaying the first UI including the visual element for executing a function associated with the fingerprint, and wherein displaying the second UI includes displaying the second UI in the second portion based at least in part on information associated with the fingerprint, in response to acquiring the information associated with the fingerprint.

18. The method of claim 13, further comprising, after identifying the second portion, displaying a third UI associated with a second user input to an entirety of the first portion and the second portion, in response to identifying the second user input for selecting a visual element in the first UI.

19. The method of claim 11, further comprising:

identifying the user input, which includes a touch gesture for touching the first point for at least a designated time and a drag gesture starting at the first point and ending at the second point, wherein displaying the second UI includes displaying the second UI having a size of the second portion, in response to identifying a third point of the user input included in a designated portion including a boundary between the first portion and the second portion.

20. The method of claim 11, further comprising stopping displaying the second UI in the second portion, while displaying the first UI and the second UI in the first portion and the second portion, respectively, in response to identifying a third user input including a drag gesture starting in the second portion and ending in the first portion.

* * * * *